(12) United States Patent
Burke et al.

(10) Patent No.: US 7,155,231 B2
(45) Date of Patent: *Dec. 26, 2006

(54) TRANSMIT PRE-CORRECTION IN A WIRELESS COMMUNICATION SYSTEM

(75) Inventors: Joseph P. Burke, Carlsbad, CA (US); Michael J. Wengler, Carlsbad, CA (US); Bhaskar D. Rao, San Diego, CA (US); Harris S. Simon, Poway, CA (US)

(73) Assignee: Qualcomm, Incorporated, San Diego, CA (US)

( * ) Notice: Subject to any disclaimer, the term of this patent is extended or adjusted under 35 U.S.C. 154(b) by 390 days.

This patent is subject to a terminal disclaimer.

(21) Appl. No.: 10/271,934

(22) Filed: Oct. 15, 2002

(65) Prior Publication Data

US 2003/0153322 A1 Aug. 14, 2003

Related U.S. Application Data

(60) Provisional application No. 60/355,296, filed on Feb. 8, 2002.

(51) Int. Cl.
*H04Q 7/20* (2006.01)

(52) U.S. Cl. .................... 455/450; 455/67.14; 342/423; 375/357

(58) Field of Classification Search ................ 455/450, 455/67.11, 67.14, 423, 424, 425; 342/111, 342/129, 423, 430, 432, 444, 463; 375/296, 375/355, 356, 357
See application file for complete search history.

(56) References Cited

U.S. PATENT DOCUMENTS

| | | | | |
|---|---|---|---|---|
| 4,780,721 A | * | 10/1988 | Dobson | 342/178 |
| 5,483,676 A | * | 1/1996 | Mahany et al. | 455/67.14 |
| 5,828,658 A | * | 10/1998 | Ottersten et al. | 370/310 |
| 5,930,288 A | * | 7/1999 | Eberhardt | 375/148 |
| 5,982,327 A | * | 11/1999 | Vook et al. | 342/380 |
| 6,041,227 A | * | 3/2000 | Sumner | 455/412.2 |
| 6,118,983 A | * | 9/2000 | Egusa et al. | 455/69 |
| 6,426,960 B1 | | 7/2002 | Antonio | |
| 6,434,366 B1 | * | 8/2002 | Harrison et al. | 455/69 |
| 6,615,024 B1 | * | 9/2003 | Boros et al. | 455/67.14 |
| 6,665,545 B1 | * | 12/2003 | Raleigh et al. | 455/562.1 |
| 6,711,412 B1 | * | 3/2004 | Tellado et al. | 455/506 |
| 6,747,594 B1 | * | 6/2004 | Lindskog et al. | 342/174 |

* cited by examiner

*Primary Examiner*—Charles N Appiah
*Assistant Examiner*—Nghi H. Ly
(74) *Attorney, Agent, or Firm*—Philip Wadsworth; Sandra L. Godsey

(57) ABSTRACT

Techniques for pre-correction of transmit signals are disclosed. In one aspect, a transmit antenna array configurable to generate multiple transmit beams is deployed. The parameters for configuring the antenna array are computed in response to channel estimates and a noise floor estimate made at the receiver. Information is transmitted in accordance with the multiple transmit beams, delayed as necessary, such that the multipaths may arrive time-aligned an in-phase at the receiver. In another aspect, pre-RAKE pre-correction is deployed by calculating Wiener weights. In yet another aspect, space-time diversity is deployed for calculating tap values for FIR filters used in transmission on the transmit antenna array. In yet another aspect, space only pre-correction is deployed. Various other aspects are also disclosed. These aspects have the benefit of reducing the interference experienced at a receiver, resulting in increased capacity, increased data throughput, and other system benefits.

44 Claims, 17 Drawing Sheets

TRANSMIT PRE-CORRECTION IN A WIRELESS COMMUNICATION SYSTEM

CLAIM OF PRIORITY UNDER 35 U.S.C. §119

The present Application for Patent claims priority to Provisional Application No. 60/355,296, entitled "TRANSMIT PRE-CORRECTION IN A WIRELESS COMMUNICATION SYSTEM," filed Feb. 8, 2002, and assigned to the assignee hereof and hereby expressly incorporated by reference herein.

BACKGROUND

1. Field

The present invention relates generally to wireless communication, and more specifically to an improved method and apparatus for space-time pre-correction of transmitted wireless signals.

2. Background

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards. Systems may incorporate support for delay-sensitive data, such as voice channels or data channels supported in the IS-2000 standard, along with support for packet data services such as those described in the IS-856 standard. One such system is described in a proposal submitted by LG Electronics, LSI Logic, Lucent Technologies, Nortel Networks, QUALCOMM Incorporated, and Samsung to the 3rd Generation Partnership Project 2 (3GPP2). The proposal is detailed in documents entitled "Updated Joint Physical Layer Proposal for 1xEV-DV", submitted to 3GPP2 as document number C50-20010611-009, Jun. 11, 2001; "Results of L3NQS Simulation Study", submitted to 3GPP2 as document number C50-20010820-011, Aug. 20, 2001; and "System Simulation Results for the L3NQS Framework Proposal for cdma2000 1x-EV-DV", submitted to 3GPP2 as document number C50-20010820-012, Aug. 20, 2001. These are hereinafter referred to as 1xEV-DV. Non-CDMA systems include the AMPS and GSM systems.

Multipath is a condition that occurs when a transmitter transmits a single signal that is then received at a receiver through multiple signal paths, each having a different length. The difference in the lengths of the paths may cause different copies of the signal to arrive at different times, causing inter-channel interference. Various techniques are known in the art for combating multipath interference. One example is a RAKE receiver. A RAKE receiver attempts to separate interfering multipaths and combine them to improve receiver performance.

Given the limited amount of spectrum available to communication carriers, it is desirable to increase the data throughput for the given amount of power in a given frequency band. Doing so may increase data rates, increase capacity, and/or reduce power (and potentially reduce costs in communication equipment). For example, due to expected asymmetric data rates on the forward link versus the reverse link of a CDMA system, there is interest in increasing the forward link system capacity and/or data throughput via spatial signal processing techniques. For example, transmit antenna arrays are being deployed to achieve gains.

However, it would be desirable if multi-path interference could be reduced or eliminated before it occurred, thus reducing or eliminating the need for multipath mitigating processing at the receiver, as well as improving the overall capacity and/or throughput of the system. There is, therefore, a need in the art for pre-correction of transmit signals to reduce multipath interference.

SUMMARY

Embodiments disclosed herein address need in the art for pre-correction of transmit signals to reduce multipath interference. In one aspect, a transmit antenna array configurable to generate multiple transmit beams is deployed. The parameters for configuring the antenna array are computed in response to channel estimates and a noise floor estimate made at the receiver. Information is transmitted in accordance with the multiple transmit beams, delayed as necessary, such that the multipaths may arrive time-aligned and in-phase at the receiver. In another aspect, pre-RAKE pre-correction is deployed by calculating Wiener weights. In yet another aspect, space-time diversity is deployed for calculating tap values for FIR filters used in transmission on the transmit antenna array. In yet another aspect, space only pre-correction is deployed. Various other aspects are also disclosed. These aspects have the benefit of reducing the interference experienced at a receiver, resulting in increased capacity, increased data throughput, and other system benefits.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
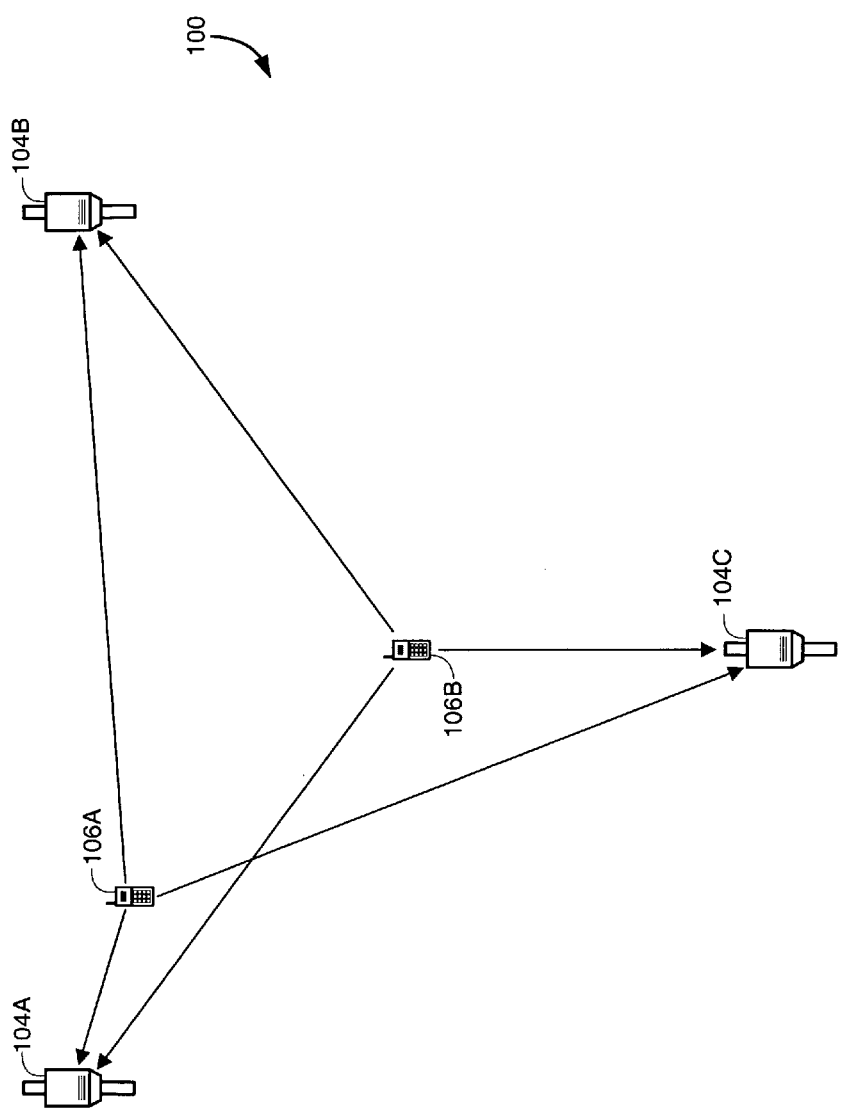
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification). For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station may be used interchangeably with the terms access point or NodeB. The term mobile station may be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one (or possibly more) base stations 104 on the forward link at any given moment, and may communicate with one or more base stations on the reverse link depending on whether or not the mobile station 106 is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations may be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Though discussed primarily in the context of a wireless communication system, a mobile station (or fixed subscriber station) may also communicate through a wired channel, for example using fiber optic or coaxial cables. A mobile station may further be any of a number of types of devices including but not limited to a PC card, compact flash, external or internal modem, or wireless or wireline phone.

Figure 2:
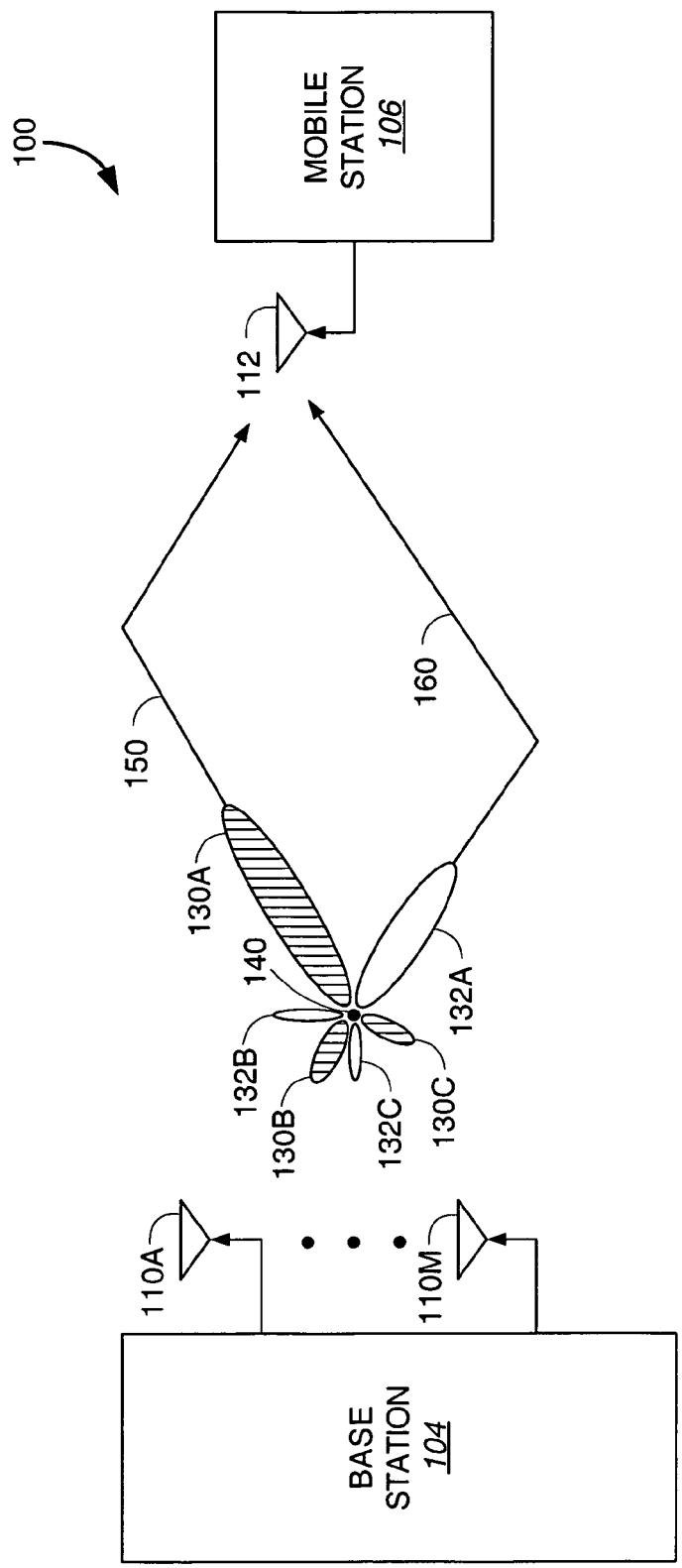
FIG. 2 depicts a portion of a wireless communication system for transmitting along multiple paths.

FIG. 2 depicts a portion of wireless communication system 100 in which a base station 104, having a plurality of transmit antennas 110A–110M, sends signals to a mobile station 106, having a receive antenna 112, through two signal paths 150 and 160. Base station 104 transmits signals through the antennas 110 such that transmit beam 130 is created for transmitting signals along signal path 150. At the same time, base station 104 transmits signals through the antennas 110 such that transmit beam 132 is created for transmitting signals along signal path 160. Though described in terms of two signal paths (150 and 160), the techniques described below extend to any number of signal paths.

The formation of transmit beams by adapting signals transmitted through multiple antennas, called beam forming, is well known in the art. Antenna beam patterns are typically shown radiating from a central point of transmission, with the distance of the curve from the central point indicating the relative strength of a signal transmitted through the antenna. For clarity, the base station 104 and associated antennas 110 are drawn to the left of the antenna beam patterns 130 and 132. In actuality, the antennas 110 would be placed in the center 140 of the antenna beam patterns 130 and 132, rather than in their center 140.

In the example shown, antenna beam pattern 130 is characterized by a primary lobe 130A and two side lobes 130B and 130C. Similarly, antenna beam pattern 132 is characterized by a primary lobe 132A and two side lobes 132B and 132C. Primary lobe 130A extends further from center 140 than either side lobe 130B or 130C, indicating that a signal transmitted through antenna beam pattern 130 will be strongest in the direction of the primary lobe 130A. As shown, antenna beam pattern 130 is formed such that primary lobe 130A points in the direction of signal path 150. Similarly, antenna beam pattern 132 is formed such that primary lobe 132A points in the direction of signal path 160. In one embodiment, delays are applied to the signals transmitted along the different signal paths such that they arrive at the antenna 112 of the receiving mobile station 106 at the same time. In this way, the effects of multipath transmission may be mitigated.

Between the lobes of an antenna beam pattern there exists a null, in which the signals transmitted through antennas 104 destructively interfere with each other. For example, in the antenna pattern 130, nulls exist between lobes 130A and 130B, between lobes 130B and 130C, and between 130C and 130A. In an embodiment, antenna beam pattern 130 is formed such that its primary lobe 130A is placed within or nearly within the null between lobes 132A and 132B of antenna beam pattern 132. Similarly, antenna beam pattern 132 is formed such that its primary lobe 132A is placed within or nearly within the null between lobes 130A and 130C of antenna beam pattern 130. Such careful arrangement of antenna beam patterns 130 and 132 reduces the degree to which the signals transmitted through each of the antenna beam patterns will interfere with each other when received at mobile station antenna 112.

Figure 3:
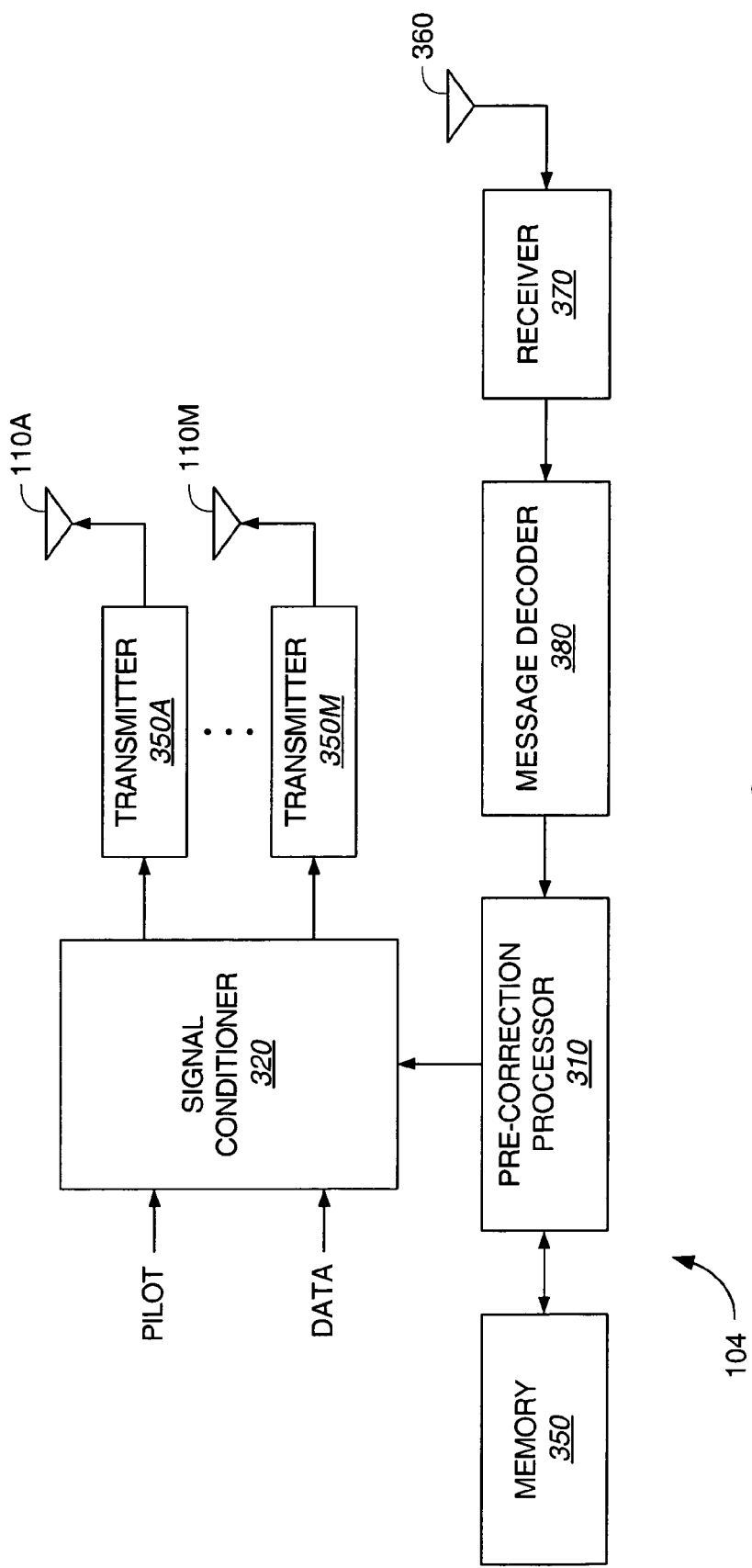
FIG. 3 depicts one embodiment of a base station.

FIG. 3 is an embodiment of a base station 104. An array of M antennas (110A–110M, described above), are driven by M transmitters 350A–350M, respectively. Transmitted signals are formatted in transmitters 350 according to one or more wireless system standards, such as those listed above, deployed in system 100. Examples of components that may be included in transmitters 350 are encoders, interleavers, spreaders, modulators of various types, amplifiers, filters, digital-to-analog (D/A) converters, radio frequency (RF) converters, and the like. One or more pilot signals and one or more data signals are delivered to signal conditioner block 320, where various processing, examples of which are described below, is performed to generate M signals for delivery to transmitters 350A–350M, respectively. Various parameters for use in generating the M signals for transmission on the M-antenna array 110 are generated in pre-correction processor 310.

The parameters are generated in response to information fed back from the mobile station 106 receiving the signals transmitted on antenna array 110. Received signals arrive at antenna 360 and are processed in receiver 370, in accordance with one or more systems or standards, such as those referenced above. Alternative embodiments may deploy an array of antennas for antenna 360, or one or more antennas 110 may be shared for receive and transmit. Examples of components that may be deployed in receiver 370 include RF downconverters, amplifiers, filters, analog-to-digital (A/D) converters, demodulators, RAKE receivers, combiners, deinterleavers, decoders (Viterbi, turbo, block decoders such as those implementing Bode-Chaudhury-Hocquenghem (BCH) codes, etc.), and others. Data from receiver 370 is delivered to message decoder 380, where various signals or messages directed to the base station 104 from a mobile station 106 are decoded. In the present embodiment, the information sent to base station 104 includes channel information and noise floor information as estimated at the mobile station 106.

Some or all of the functions of signal conditioner 320, transmitters 350, receiver 370, message decode 380, and pre-correction processor 310 may be carried out in processor such as a Digital Signal Processor (DSP) or other general or special purpose processor (not shown). These functions may also be may also be performed using special purpose hardware, co-processors, a combination of processors or DSPs, or a combination of all of the above. A processor, including pre-correction processor 310, will commonly contain, or be connected with, one or more memory elements 350 for storing instructions to carry out the various tasks and processes described herein as well as for data storage.

Throughout this description, base station 104 will be described as communicating with a single user, or mobile station 106. This is for clarity. Those of skill in the art will recognize that the principles of the present invention also apply to multi-user systems, and a typical system 100 will be a multi-user system. Certain systems, such as the IS-856 standard, use the entire available spectrum to transmit to one user at any given time. Other systems, such as IS-95 and cdma2000, transmit to multiple users simultaneously. Antennas 110A–110M may be used to transmit signals to one user or to multiple users simultaneously.

The parameters generated by pre-correction processor 310 may vary according to the particular embodiment deployed. Various embodiments are described below, including independent space and independent time pre-correction (also referred to as pre-RAKE processing), space-time pre-correction, and space only pre-correction. All of these pre-correction techniques fall within the scope of the present invention, and one or more of these techniques may be deployed in accordance with the type of system deployed.

In an alternate embodiment, base station 104 may be deployed without pre-correction processor 310. The pre-correction parameters may be generated in an alternate device, such as mobile station 106, and transmitted for application to signal conditioner 320 via antenna 360, receiver 370, and message decoder 380, as described above. This alternate embodiment is not shown.

Figure 4A:
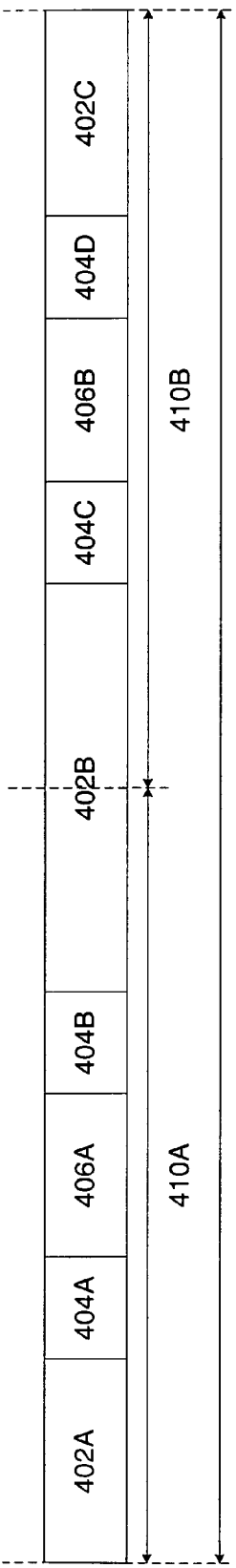
FIGS. 4A–4C depict transmit frame formats.
Figure 4B:
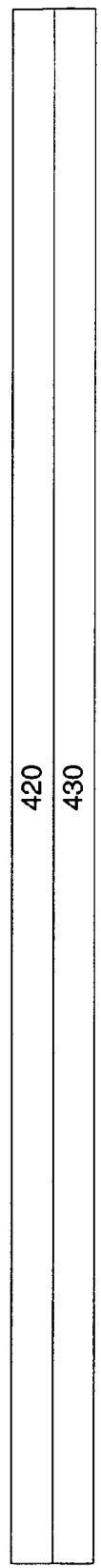
Figure 4C:
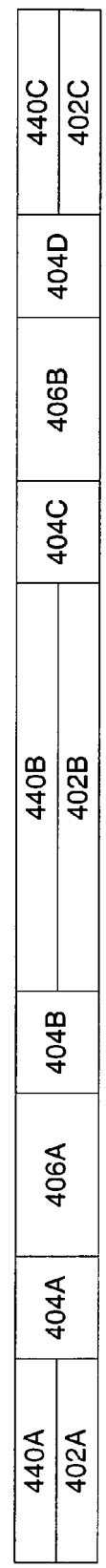

FIGS. 4A–4C depict three forward link channel structures. In FIG. 4A, a per-antenna pilot burst is transmitted periodically through each transmit antenna. The base station 104 transmits signals within time slots, or frames, 412 of a fixed duration. Each time slot is divided into two half-slots 410A and 410B. In a cdma2000 system, time slots have a fixed length of 2048 symbol chips and a duration of 1.667 milliseconds. Accordingly, each half-slot has a fixed length of 1024 symbol chips. One skilled in the art will recognize that alternate embodiments may use slots of different lengths or lengths that are not fixed in duration.

In one embodiment, a per-antenna pilot burst 406 is transmitted through each transmit antenna at the center of each half-slot 410. The pilot bursts 206 are covered with antenna-specific codes to enable the mobile station to distinguish the pilot received through each antenna. The antenna-specific codes are Walsh codes, with a different Walsh code being assigned to the pilot for each transmit antenna 110. In each frame 412, the base station 104 transmits Medium Access Control (MAC) channel signals 404 immediately before and after each pilot burst 406. The remaining portions 402 of each time slot 412 are used to carry forward link data.

The data portions 402 of the time slot 412 are transmitted along multiple transmit beams 130 and 132, formed to transmit signals optimally through multipath signal paths 150 and 160. Because the transmit paths 150 and 160 generally have different lengths, signals transmitted through them take different amounts of time to reach the mobile station 106. In one embodiment, base station 104 advances or retards the signals transmitted through transmit beams 130 and 132 as necessary to ensure that these signals arrive at the antenna 112 of the mobile station 106 at substantially the same time. Thus, some of the data portions 402 may be transmitted with variable delays relative to the pilot portions 406 and MAC portions 404 of the time slot 412.

Advancing or retarding the data portions 402 of the frame may result in some overlap of the data with the MAC portions 404 or the pilot burst portions 406 of the frame. Such overlap may cause substantial surges or spikes in the power required to transmit the composite signals. Such surges may overload a high power amplifier (HPA) in a transmitter or cause increased interference to signals in the coverage areas of neighboring base stations. Many approaches may be used for mitigating these surges. For example, a guard band may be placed between the data portions 402 and MAC portions 404 of the frame (or alternatively, between the MAC portions 404 and the pilot portions 406, if the MAC portions are time shifted in the same manner as the data). The guard band would be wide enough to accommodate the largest probable difference in the lengths of the signal paths 150 and 160 (also referred to as "multipath spread"). For example, a guard band of three chips might be enough to accommodate the multipath spread of a typical wireless communication system. Another approach to mitigating transmit power surges would be to truncate or gate the MAC portions 404 as necessary to avoid overlap with the data portions 402 of the frame. Alternatively, the data portions 402 could be truncated or gated in order to avoid such overlap. In another example, the overlapping regions of the MAC portions 404 and the data portions 402 could be attenuated so that the power in the sum of the signals is approximately the same as in other portions of the frame.

FIG. 4B shows an alternate forward link channel structure. A pilot 430 is transmitted simultaneously with a data portion 420 during the entire frame. With this structure, the data may be coherently demodulated with the pilot signal that is simultaneously being transmitted. For clarity, a MAC portion is not shown, although one of skill in the art will readily adapt this to accommodate MAC signaling, or any other type of signaling that is desired. In one embodiment, both the pilot and data are time shifted to arrive at essentially the same time at the mobile station 106. This is in contrast to the embodiment using a structure as described in FIG. 4A, where the pilot was not time-shifted with the data. In the previous structure of FIG. 4A, the pilots from each of the various multipaths could be distinguished by their respective time offsets. In the structure of FIG. 4B, when the pre-correction processor is performing well, the pilots from each path will not be readily distinguishable, since they arrive at the same time. Therefore, in one embodiment using the frame structure of FIG. 4B, the pilot signal will be coded with a code per antenna, as before, as well as per path. Thus, an estimate of each path, with a component corresponding to each antenna for that path, may be made. Embodiments using each of the frame formats will be described in further detail below.

FIG. 4C shows yet another alternate forward link channel structure. The structure includes all of the components of FIG. 4A, described above. The pilot portion 406 will be coded per antenna, and will not be time shifted. Pilot 406 may thus be used for estimating the channel, as described above. An additional pilot 440 (shown in three sections, 440A, 440B and 440C) is transmitted simultaneously with the data portions 402, and conditioned in the same manner. The additional pilot may be used for data demodulation (as may pilot 406). However, unless pilot 440 is covered with codes per path and per antenna, as described in FIG. 4B, or identified with an alternate technique, pilot 440 may not be as readily usable for channel estimation as pilot 406.

The format of FIG. 4C is essentially a blend of the formats shown in FIG. 4A and FIG. 4B. One skilled in the art will recognize other variations on transmitting per-antenna pilot signals, per-path pilot signals, and otherwise enabling the mobile station 106 to distinguish signals received through multiple transmit antennas and through multiple transmit paths. These and other variations fall within the scope of the present invention.

Figure 5:
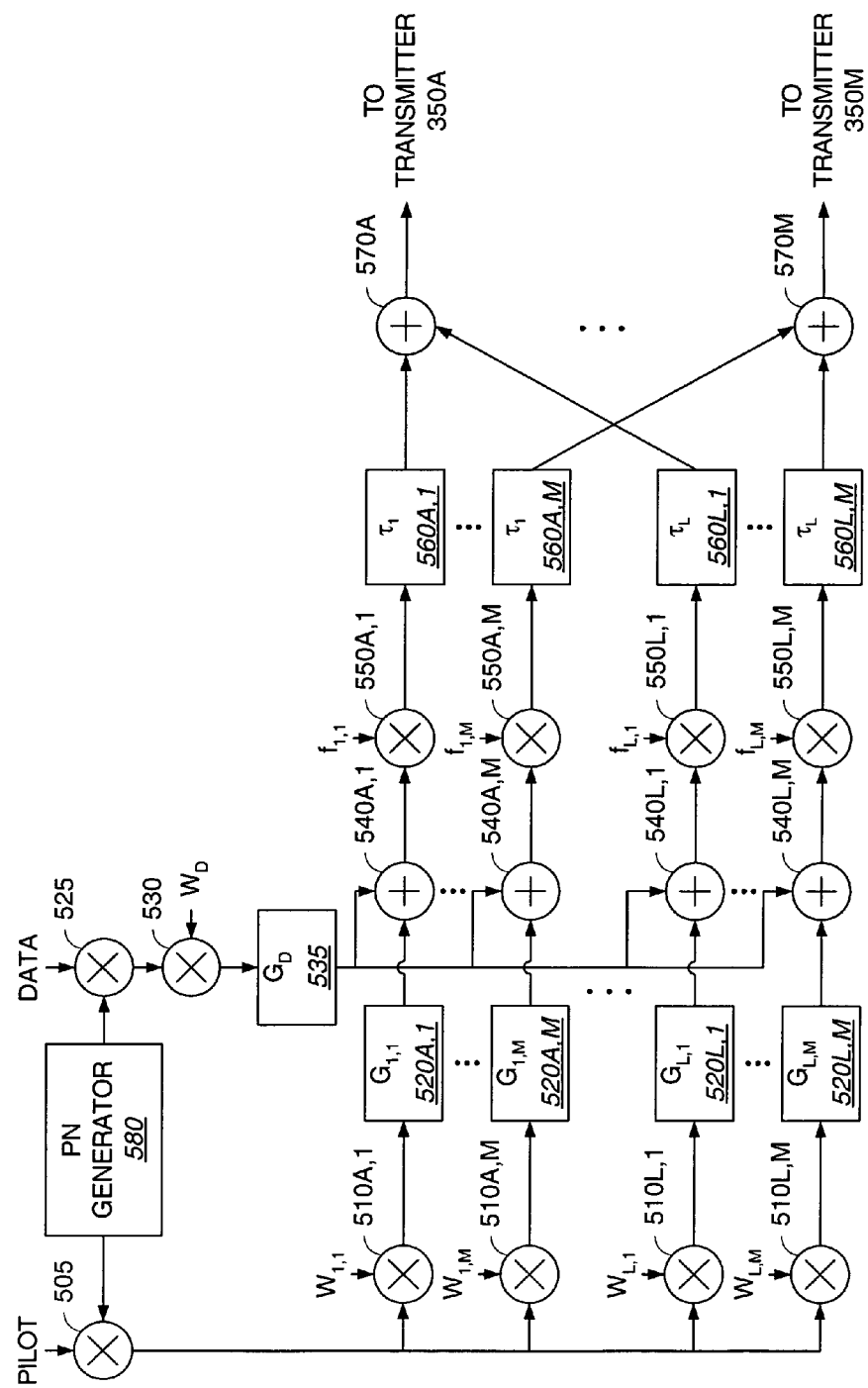
FIG. 5 depicts a signal conditioner for use with simultaneously transmitted pilot and data.

FIG. 5 depicts an embodiment of a signal conditioner 320, configured for use with a simultaneously transmitted pilot and data signal, such as described with respect to FIG. 4B above. This embodiment supports L paths and M antennas. The data and pilot are weighted and delayed together, such that they may be coherently combined when received at a mobile station 106. A PN sequence, useful for distinguishing a base station, or a sector within a base station, as known in the art, is generated in PN generator 580 and applied to both the pilot and data signals in PN spreaders 505 and 525, respectively. The spread data is then Walsh covered in Walsh cover 530 with Walsh code WD. (Note that Walsh codes are used herein for encoding data and pilot signals. This serves as an example only. Other encoding schemes and codes are known in the art and fall within the scope of the present invention.) The Walsh covered, spread data may be gain adjusted with gain $G_D$ in gain block 535, which is optional.

As described above, during optimum performance, pre-correction processor 310 produces weights and delays that cause the signals received along the various M multipaths to arrive simultaneously and in-phase. In order to distinguish the various paths, as well as the per-antenna components contributing to the signal on any path, a code for each path/antenna pair is applied to the pilot to create M*L unique pilots. The M*L pilots are generated by Walsh covering (or other encoding) the pilot with the M*L Walsh codes $W_{1,1}$–$W_{L,M}$ in Walsh covers 510A,1–510L,M, respectively. Those of skill in the art will recognize that one of the Walsh codes may be selected as the all ones pattern, in which case one of the Walsh cover blocks may be omitted. The Walsh codes are labeled to distinguish a path and an antenna. Thus, there are M codes, one for each antenna 110, for the first path, labeled $W_{1,1-W1,M}$. The M codes for the $L^{th}$ path are then labeled $W_{L,1}$–$W_{L,M}$, respectively. In the general case, the M*L pilots may be gain adjusted individually by gain factors $G_{1,1}$–$G_{L,M}$ in gain blocks 520A,1–520L,M, respectively. The gain blocks are optional. In an alternate embodiment, a single gain factor could be applied prior to Walsh covering in Walsh covers 510 to provide a relative weight to the pilot with respect to the data. Various means for generating M*L encoded, gain adjusted versions of a pilot are known in the art and fall within the scope of the present invention. This encoding allows a mobile station 106 to estimate the channel characteristics for the various paths as well as the contributions to each path by the various antennas 110.

The M*L pilots are summed with the data in summers 540A,1–540L,M. The combined data and pilot signals are then weighted in multipliers 550A,1–550L,M with factors $f_{1,1}$–$f_{L,M}$, respectively. The weighted signals are delayed in delay blocks 560A,1–560L,M, respectively, using delays $\tau_1$–$\tau_L$. Note that one of the L delays is used for each of the M antenna components for that path. For example, the output of multipliers 550A,1–550A,M are the signals for path 1 for each of the M antennas. Each of these are delayed in delay blocks 560A,1–560A,M, respectively, using delay $\tau_1$. Similarly, the output of multipliers 550L,1–550L,M are the signals for path L for each of the M antennas. Each of these are delayed in delay blocks 560L,1–560L,M, respectively, using delay $\tau_L$.

The components for each path corresponding to an antenna are then summed in summers 570A–570M. Each summer 570 will receive L inputs, corresponding to the L paths. For example, the signal for delivery to transmitter 350A, which prepares the signal for transmission on antenna 110A, are the L summed outputs of delay blocks 560A, 1–560L,1, one for each path. Similarly, the signal for delivery to transmitter 350M, which prepares the signal for transmission on antenna 110M, are the L summed outputs of delay blocks 560A,M–560L,M, one for each path.

Figure 6:
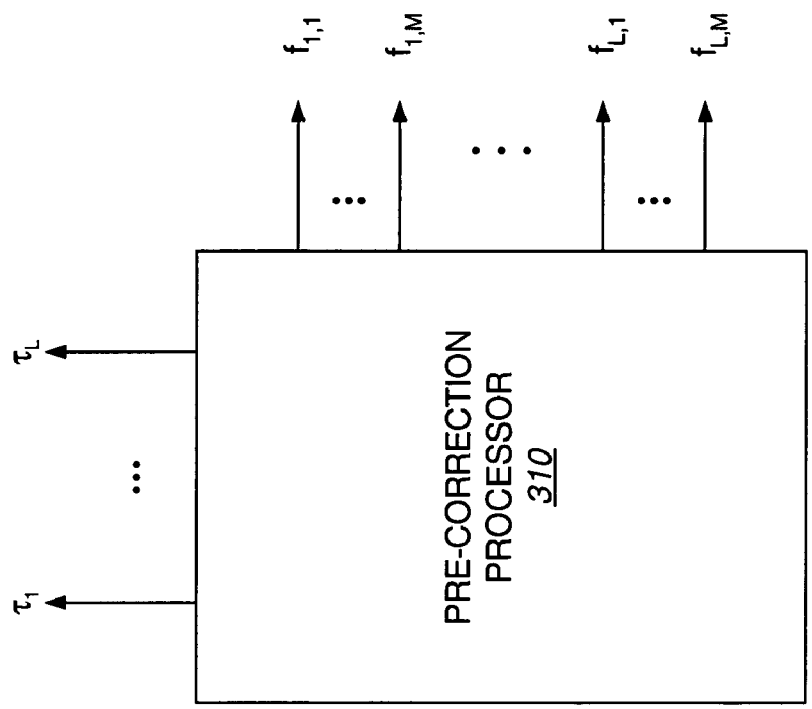
FIG. 6 depicts a pre-correction processor.

The weights, $f_{1,1}$–$f_{L,M}$, and the delays, $\tau_1$–$\tau_L$, are determined by pre-correction processor 310, the depiction of an embodiment of which is shown in FIG. 6. The embodiment shown in FIG. 6 is useful for pre-RAKE (or independent space, independent time) pre-correction processing. The delays, $\tau_1$–$\tau_L$, may be determined as signaled from a mobile station, where a searcher, finger, or other path-tracking device identifies the relative delay in the paths. The delays may be adjusted such that the signals traveling along the various multipaths in the channel arrive at the mobile station at essentially the same time. In some embodiments, the delays for (L−1) paths may be determined with respect to one other path. Those of skill in the art will recognize that in such situations one of the delay blocks may be eliminated for the normalizing path. The weights, which include a magnitude and phase adjustment for phase-aligned reception at the mobile station, are determined in accordance with an embodiment of a pre-RAKE pre-correction method, examples of which are detailed below.

As described in further detail below, for alternate pre-correction techniques, the parameters determined in pre-correction processor 310 may be different. For example, in space only pre-correction, delays are not used, and so only the weights are determined. For space-time pre-correction, the taps and weights of Finite Impulse Response (FIR) filters are determined, to perform simultaneous space and time pre-correction of the input signals in response to the channel estimate information.

With respect to the embodiment shown in FIG. 5, this description has assumed the general case where each antenna/path pilot fades independently, and thus M*L codes are deployed. Those of skill in the art will recognize that subarrays of antennas may also be deployed. In these situations, the pilots associated with a subarray need not be uniquely identified, since all antennas within a subarray essentially fade together. In these situations, less than M*L codes may be deployed, with a corresponding reduction in Walsh cover blocks, gain blocks, and the like. These details are not shown, but those of skill in the art will readily adapt the principles described herein where the bank of M antennas comprises one or more subarrays of antennas.

Those of skill in the art will recognize that the various components may be arranged differently than shown to generate essentially the same output at each antenna 110, or different outputs for performing similar functions. These other possible arrangements may achieve the same results and fall within the scope of the present invention.

In the embodiment shown in FIG. 5, each delay is associated with a different transmit beam and transmit path. In order to form a beam for the path associated with delay $\tau_1$, for example, the output of the delays 560A,1–560A,M must be adjusted for each of the M transmit antennas 110, as described above. The M*L weighting units 550 each apply a weight f that is specific to a single antenna 110 and the transmit beam or path corresponding to the delay. All M of the weighting units for a delay are associated with the transmit beam or path corresponding to that delay. As described, the subscripts of the weights f indicate a corresponding path and antenna. For example, $f_{1,1}$ is the weight corresponding to path 1 and antenna 110A, and $f_{1,M}$ is the weight corresponding to path 1 and antenna 110M. Similarly, $f_{L,1}$ is the weight corresponding to path L and antenna 110A, and $f_{L,M}$ is the weight corresponding to path L and antenna 110M.

Figure 7:
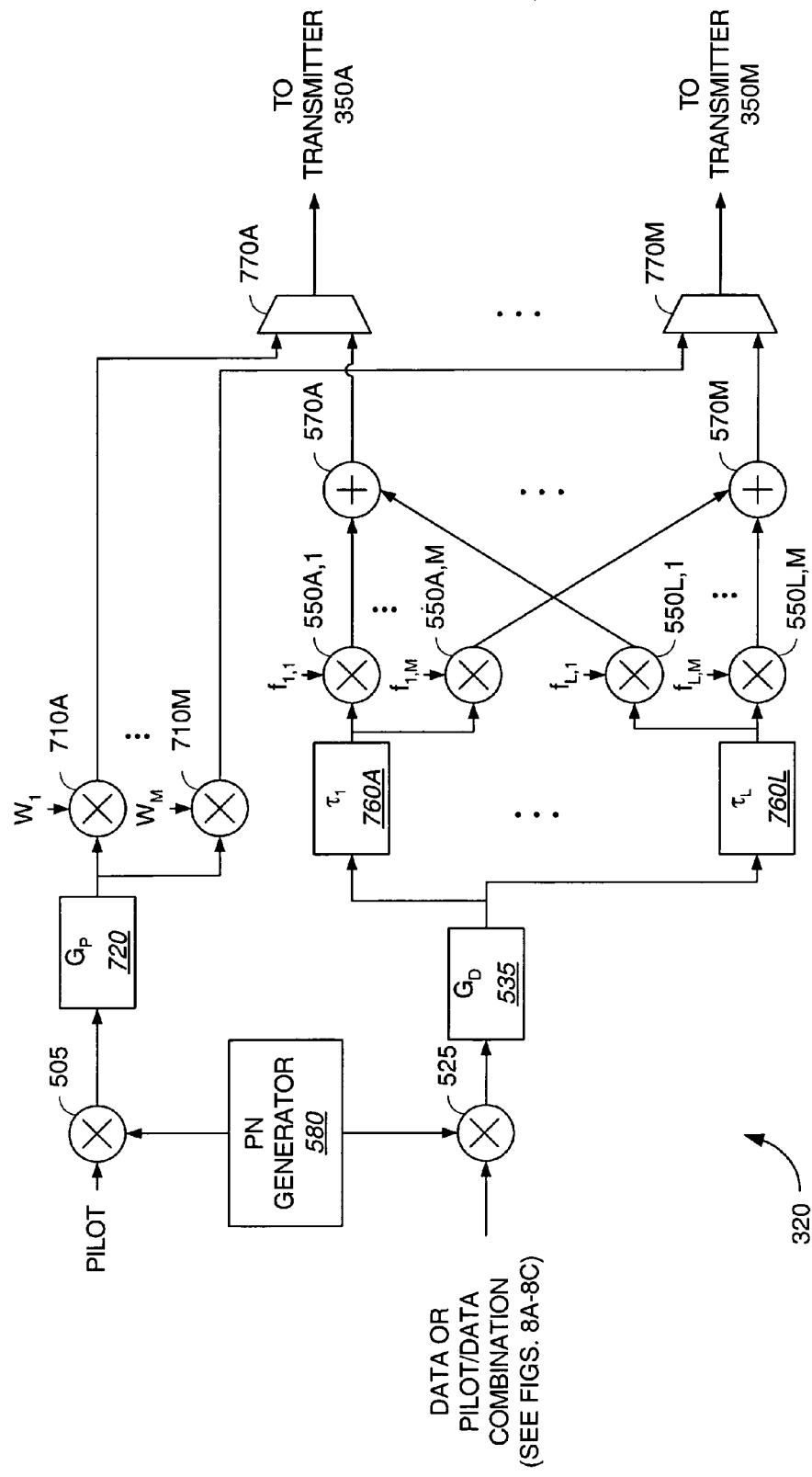
FIG. 7 depicts a signal conditioner for use with pre-corrected data and pilot bursts.

FIG. 7 depicts an embodiment of a signal conditioner 320, configured for use with a data signal and a pilot that is not delayed and weighted with the data signal, such as described with respect to FIG. 4A or 4C above. The pilot used for channel estimation, such as pilot 406 in FIGS. 4A and 4C is PN spread in spreader 505 in response to a PN sequence generated in PN generator 580, as described with respect to FIG. 5 above. The result may optionally be gain adjusted with gain $G_P$ in gain block 720. The PN spread, gain adjusted pilot is then encoded for identification on each of the antennas 110, using M codes. In one embodiment, the pilot is Walsh covered with codes $W_1$–$W_M$ in Walsh covers 710A–710M, respectively. The pilots are selected for delivery to transmitters 350A–350M by MUXes 770A–770M, respectively. The selection of the pilot may be combined with techniques for mitigating overlap with delayed data, as described above.

The data signal (or data/pilot combination, as described with respect to FIGS. 8A–8C, below) is delivered for PN spreading in PN spreader 525 in response to the PN sequence generated in PN generator 580, as described above with respect to FIG. 5. The data signal may be optionally gain adjusted with gain $G_D$ in gain block 535. The data signal is then delayed in delay blocks 760A–760L to provide the timing adjustments, $\tau_1$–$\tau_L$, respectively, as determined in accordance with the channel estimates, described above. Each delay block corresponds to the compensation for one of the L paths. The delayed data signals are then weighted, by a factor f, in M*L multipliers 550A corresponding to the L delays and M antennas, in the same fashion as described for FIG. 5. The factors f and the delays $\tau$ are determined with a pre-correction processor 310, such as described above with respect to FIG. 6. The weighted values are then summed for each of the M antennas 110 in summers 570A–570M, respectively. The data signals are selected for delivery to transmitters 350A–350M though MUXes 770A–770M, respectively, for alternately transmitting the data signal (or data/pilot combination) or the pilots used for channel estimation.

Figure 8A:
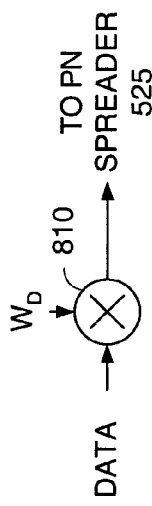
FIGS. 8A–8C depict alternatives for input to a PN spreader, depending on the forward link channel structure chosen.
Figure 8B:
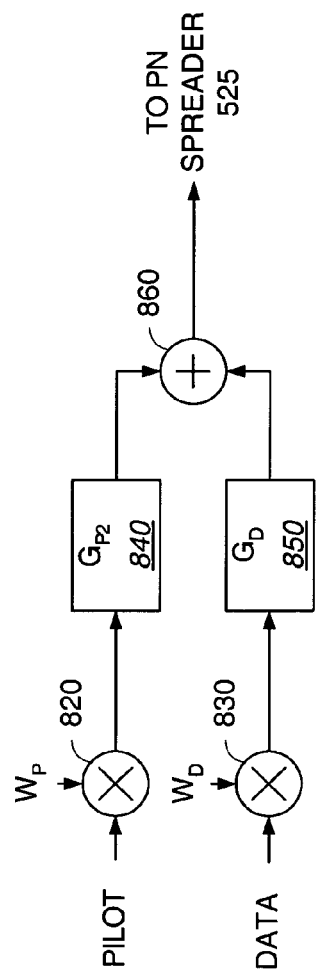
Figure 8C:
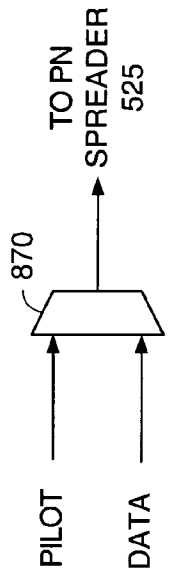

FIGS. 8A–8C depict alternatives for input to PN spreader 525, depending on the forward link channel structure chosen. FIG. 8A shows the data being Walsh covered by Walsh function $W_D$ in Walsh cover 810, then directly delivered to PN spreader 525. This corresponds to the structure depicted in FIG. 4A. In FIG. 8B, for a structure such as shown in FIG. 4C, a pilot (which may be the same pilot used for channel estimation, or an alternative pilot) is Walsh covered using Walsh code $W_P$ in Walsh cover 820 and optionally gain adjusted with gain $G_{P2}$ (to distinguish from the optional gain $G_P$ in block 720) in block 840. The data is covered by Walsh function $W_D$ in Walsh cover 830 and optionally gain adjusted with gain $G_D$ in block 850 (note that optional gain block 535 could be omitted in this embodiment). The covered and weighted pilot and data are summed in summer 860 for delivery to PN spreader 525. FIG. 8C shows another alternative, in which the pilot and data (suitably gain adjusted or Walsh covered as necessary, details not shown) are muxed in MUX 870 prior to delivery to PN spreader 525. This third option does not have a corresponding representative format shown in FIGS. 4A–4C. These embodiments are representative only. Those of skill in the art will recognize myriad channel structures and corresponding implementations, which are suitable for use with the pre-correction techniques disclosed herein, and fall within the scope of the present invention.

Pre-Rake Pre-Correction

As described above, pre-correction processor 310 may be deployed to provide independent space, independent time, or pre-RAKE, pre-correction. The pre-RAKE algorithm identifies multiple independently fading ray paths or multipaths from the channel estimate information. The pre-RAKE algorithm may be used to generate delay values $\tau_1$–$\tau_L$ and weights f to form one transmit beam and delay corresponding to each of the multipaths. In one embodiment, the delay values and weights are computed using the channel estimate information and a noise floor estimate from the mobile station. The delays may be determined at the mobile station by identifying pilots transmitted in association with the paths and antennas, and fed back to the base station. The pre-RAKE algorithm may generate the weights using Wiener weighting, also referred to as Optimal Combining (OC) weighting. In an alternative embodiment, Maximal Ratio Combining (MRC) weighting may be deployed. In this section, equations for computing both types of weights are provided. In addition, some theoretical background is included, using assumptions based on one particular situation.

The theoretical background is discussed for pre-correction, at the base station, of a fading wireless channel for a single user Forward Link (FL) system with multiple transmitting antennas. The results obtained may be deployed in a pre-correction processor, such as pre-correction processor 310, described above. These results may also be used in multi-user systems, examples include data only systems such as HDR, voice systems such as cdma2000 and IS-95, as well as combined voice/data systems such as 1xEV-DV. Those of skill in the art will readily adapt these principles to known systems as well as to new systems as they are developed.

The per user near maximum Carrier to Interference Noise Ratio (CINR) may be obtained if the entire FL channel state information is used in an Optimal Combining (OC) Pre-Rake pre-correction.

Obtaining all three spatial processing gains (specifically: 1) array gain; 2) diversity gain; and 3) interference suppression) via a forward link pre-correction algorithm simultaneously in both the spatial and temporal domains has proven difficult due to unknown forward link channel states. Previous systems have used feedback on the reverse link to send the forward link per antenna fading coefficients.

In the pre-RAKE embodiments described herein, the entire forward link channel state information is utilized which includes the per multi-path (MP) channel fading coefficients, per MP time delay, and per MP signal power to background noise ratio. The additional channel state data allows the FL pre-correction algorithm to obtain true maximization of the FL CINR for a single user.

The MP time delay is expected to change at a much slower time constant than the fading coefficients of the channel. The MP time delay information may be obtained using the reverse link, as described above. However, as described below, if the reverse link time delay information is not available or a time adjusted weighted solution is not desired, a space only pre-correction may be deployed.

A single cell forward link environment is assumed, to simplify the analysis. Note, however, that in a multi-cell environment with a mobile station antenna array, the forward link Optimal Combining (OC) Pre-RAKE algorithm presented here increases the effective degrees of freedom of the mobile station array by allowing the mobile station array to concentrate solely on other cell interference terms.

The pilot and the data signals are initially modeled as a common signal to simplify the analysis and to give insight into the CINR equations. Depending upon the antenna array 110 configuration, a per antenna or per "beam" pilot may be needed. Thus the pilots may be identifiable at the receiver even when the data combines coherently. Various configurations are described above with respect to FIGS. 3–8 and such configurations serve as examples.

A frequency selective Rayleigh fading channel model, perfect average power control, and perfect estimates of all parameters are assumed for this example. The multipaths received by a user are resolved on a power and time delay basis and each multipath is fading and distributed in time, un-correlated with other multipaths. When resolvable multipaths are present at the receiver, the mobile station 106 may deploy a RAKE receiver (described in further detail below with respect to FIG. 12). The RAKE receiver may employ Maximal Ratio Combining (MRC).

The desired user signal is $s_0(t)$. The vector channel model, $h_{M,L}(t,\tau)$, has L independently fading ray paths or multipaths from the M base station transmitting antennas 110 to the mobile station 106 receiving antenna 112. Each time resolvable multipath has un-correlated fading parameter $\vec{c}$.

The low pass equivalent impulse response of the channel is described as:

$$h_{M,L}(t,\tau) = \sum_{i=0}^{L-1} \vec{c}_i A_i(\Delta\tau_i)\delta(t-\tau_i) \qquad (1)$$

or, in matrix form:

$$\underset{M \times L}{H} = [\vec{c}_0 A_0(\Delta\tau_0)\delta(t-\tau_0)\vec{c}_1 A_1(\Delta\tau_1) \qquad (2)$$

$$\delta(t-\tau_1)\cdots \vec{c}_{L-1} A_{L-1}(\Delta\tau_{L-1})\delta(t-\tau_{L-1})]$$

$A_1^2(t-\tau_1)=A_1^2(\Delta\tau_1)$ in (1) is the Multi-path Intensity Profile (MPIP), which is derived from the auto-correlation of the channel and is a relation for how the intensity of the multipath changes with delay and may typically be modeled as an exponentially decreasing function with increasing delay. We will normalize the MPIP, $A_1^2(t-\tau_1)=A_1^2(\Delta\tau_1)$, of he channel to first arriving multi-path ($A_0^2(0)=1$).

The relative time constants in the channel are assumed such that time delays between multipaths, $\tau_0-\tau_1=1/B_{coh}$, are smaller or occur less often than changes in channel vector coefficients, $\Delta T_{chan}=1/B_{dopplar}$. That is, the Doppler bandwidth, $B_{Doppler}$, is much less than the coherence bandwidth of the channel, $B_{coh}$ or $B_{coh} \gg B_{Doppler}$.

The uncombined signal only term, x, received at mobile station 106, in matrix form as the convolution of the user's signal and the channel is written as:

$$\underset{M \times L}{X} = s_0(t) * \underset{M \times L}{H} \qquad (3)$$

which may be simplified to:

$$\underset{M \times L}{X} = [s_0(t-\tau_0)\vec{c}_0 A_0(\Delta\tau_0) s_0(t-\tau_1) \qquad (4)$$

$$\vec{c}_1 A_1(\Delta\tau_1)\cdots s_0(t-\tau_{L-1})\vec{c}_{L-1} A_{L-1}(\Delta\tau_{L-1})]$$

$$= [\underset{M \times 1}{X_0} \quad \underset{M \times 1}{X_1} \quad \cdots \quad \underset{M \times 1}{X_{L-1}}]$$

where the combined signal only term, x, at the mobile station antenna is (equivalent to using equal gain combining in space and MRC in time):

$$x = \underset{1 \times M}{[1]} \cdot \underset{M \times L}{X} \cdot \underset{L \times 1}{a}$$

where the mobile station time RAKE MRC weights are defined as:

$$a^T_{1\times L} = \qquad (5)$$

$$[a_0 a_1 \cdots a_{L-1}]^T = \left[\left(\underset{1\times M}{1} \cdot \underset{M\times 1}{\vec{c}_0}\right)^* \left(\underset{1\times M}{1} \cdot \underset{M\times 1}{\vec{c}_1}\right)^* \cdots \left(\underset{1\times M}{1} \cdot \underset{M\times 1}{\vec{c}_{L-1}}\right)^*\right]^T$$

The signal and noise terms at the mobile receiving antenna are written as the convolution of the user's signal and the channel plus background noise as:

$$\vec{r}(t) = s_0(t) * h_{M,L}(t,\tau) + n(t) = \qquad (6)$$

$$\underset{1\times M}{[1]} \cdot \left[s_0(t) * \underset{M\times L}{H}\right] \cdot \underset{L\times 1}{a} + n(t) = \underset{1\times M}{[1]} \cdot \underset{M\times L}{X} \cdot \underset{L\times 1}{a} + n(t)$$

which may be simplified to:

$$\vec{r}(t) = \underset{1\times M}{[1]} \cdot \left[s_0(t-\tau_0)\vec{c}_0 A_0(\Delta\tau_0)s_0(t-\tau_1)\vec{c}_1 \qquad (7)\right.$$

$$\left. A_1(\Delta\tau_1) \cdots s_0(t-\tau_{L-1})\vec{c}_{L-1}A_{L-1}(\Delta\tau_{L-1})\right] \cdot \underset{L\times 1}{a} + n(t)$$

where the signal $\vec{r}(t)$ represents the received waveforms from all 0:M−1 antenna array elements and all 0:L−1 multipaths. The background white noise term on the mobile antenna element is assumed complex Gaussian (circular Gaussian) zero mean with variance equal to $\sigma^2$, i.e. $N_m 9 \approx (0, \sigma^2)$.

In the following, Optimal Combining (OC) weighting and Maximal Ratio Combining (MRC) pre-correction algorithm techniques are analyzed to increase the users CINR. Each approach is compared using the same total transmit output power. Defining the spatial weight for $MP_i$ as, $\vec{w}_1$, (where w corresponds to weight f as described above with respect to FIGS. 5–7) the sum of the norms of the spatial weights of all multipaths is equal to one, i.e.

$$\sum_{i=0}^{L-1} \|w_1\|^2 = 1.$$

The transmit antenna spatial weight matrix, w, is defined as:

$$\underset{M\times L}{W} = \left[\vec{w}_0 \ \vec{w}_1 \ \cdots \ \vec{w}_{L-1}\right] \qquad (8)$$

The forward link transmit antenna spatially weighted uncombined signal only term, $Y=W^H X$, in matrix form at the mobile station antenna, is written as:

$$\underset{L\times L}{Y} = \underset{L\times M}{W^H} \underset{M\times L}{X} = \begin{bmatrix} \vec{w}_0^H \\ \vec{w}_1^H \\ \vdots \\ \vec{w}_{L-1}^H \end{bmatrix} \cdot \left[s_0(t-\tau_0)\vec{c}_0 A_0(\Delta\tau_0) s_0(t-\tau_1)\vec{c}_1 A_1(\Delta\tau_1) \cdots s_0(t-\tau_{L-1})\vec{c}_{L-1}A_{L-1}(\Delta\tau_{L-1})\right] = \qquad (9)$$

$$\begin{bmatrix} \vec{w}_0^H \vec{c}_0 s_0(t-\tau_0)A_0(\Delta\tau_0) & \vec{w}_0^H \vec{c}_1 s_0(t-\tau_1)A_1(\Delta\tau_1) & \cdots & \vec{w}_0^H \vec{c}_{L-1}s_0(t-\tau_{L-1})A_{L-1}(\Delta\tau_{L-1}) \\ \vec{w}_1^H \vec{c}_0 s_0(t-\tau_0)A_0(\Delta\tau_0) & \vec{w}_1^H \vec{c}_1 s_0(t-\tau_1)A_1(\Delta\tau_1) & \cdots & \vdots \\ \vdots & \vdots & \ddots & \vdots \\ \vec{w}_{L-1}^H \vec{c}_0 s_0(t-\tau_0)A_0(\Delta\tau_0) & \cdots & \cdots & \vec{w}_{L-1}^H \vec{c}_{L-1}s_0(t-\tau_{L-1})A_{L-1}(\Delta\tau_{L-1}) \end{bmatrix} =$$

$$\begin{bmatrix} \underset{L\times 1}{Y_0} & \underset{L\times 1}{Y_1} & \cdots & \underset{L\times 1}{Y_{L-1}} \end{bmatrix}$$

The mobile station time RAKE MRC weights for Y are defined to be the complex conjugate of the channel components of Y along its diagonal (desired pre-weighting component):

$$\underset{1\times L}{b^T} = [b_0 b_1 \cdots b_{L-1}]^T = \left[\left(\vec{w}_0^H \vec{c}_0\right)^* \left(\vec{w}_1^H \vec{c}_1\right)^* \cdots \left(\vec{w}_{L-1}^H \vec{c}_{L-1}\right)^*\right]^T \qquad (10)$$

The weighted combined signal only term, y, at the mobile station antenna may then be written as:

$$y = \underset{1\times L}{[1]} \cdot \underset{L\times L}{Y} \cdot \underset{L\times 1}{b}$$

The weighted signal and mobile station noise term at the mobile receiving antenna is then written as:

$$\vec{r}(t) = \underset{1 \times L}{[1]} \cdot$$

$$\begin{bmatrix} \vec{w}_0^H \vec{c}_0 s_0(t-\tau_0) A_0(\Delta\tau_0) & \vec{w}_0^H \vec{c}_1 s_0(t-\tau_1) A_1(\Delta\tau_1) & \cdots & \vec{w}_0^H \vec{c}_{L-1} s_0(t-\tau_{L-1}) A_{L-1}(\Delta\tau_{L-1}) \\ \vec{w}_1^H \vec{c}_0 s_0(t-\tau_0) A_0(\Delta\tau_0) & \vec{w}_1^H \vec{c}_1 s_0(t-\tau_1) A_1(\Delta\tau_1) & \cdots & \vdots \\ \vdots & \vdots & \ddots & \vdots \\ \vec{w}_{L-1}^H \vec{c}_0 s_0(t-\tau_0) A_0(\Delta\tau_0) & \cdots & \cdots & \vec{w}_{L-1}^H \vec{c}_{L-1} s_0(t-\tau_{L-1}) A_{L-1}(\Delta\tau_{L-1}) \end{bmatrix} \cdot \underset{L \times 1}{b} + n(t) \quad (11)$$

Note that the dominant desired signal terms are those terms along the diagonal of Y in Equs. (9, 11). The off-diagonal terms result from spatially weighting each $MP_i$ separately.

The mobile station combined signal and noise output, assuming the mobile terminal receive path RAKE demodulator adds together the time resolvable multipaths coherently, is the per MP weighted sum of the desired signals and the interference signals. The desired signal in $MP_i$ is the portion of the transmitted signal that is correctly time aligned to the $MP_i$ processing finger in the RAKE, while the interference to the desired signal in $MP_i$ is the background noise plus all other multipaths $MP_j$ where $j \neq i$.

In Equs. (9, 11), each column in Y represents signals arriving at a specific time offset. The dominant desired signal term in each column or time offset falls on the diagonal of Y and is correctly co-phased. The other elements in each column that do not fall on the diagonal of Y are dependent upon other MP weights and hence introduce additional signal terms with random amplitude and phase (on a time scale of the fading rate of change). The elements in each column that do not fall on the diagonal could be classified either as additive signal terms (although with random amplitude and phase) or as interference (due to randomness). The elements in each column or time offset that are not on the diagonal of Y are categorized as interference terms when calculating the CINR.

The mobile station CINR, using the mobile station RAKE that after reception time aligns and combines the desired signal for all relevant MP's in Equ. (11), is described as:

$$CINR = \frac{\left| \underset{1 \times L}{[1]} \cdot \left[ \underset{L \times L}{\mathrm{diag}\, Y} \right] \cdot \underset{L \times 1}{b} \right|^2}{\left| \sum_{i=0}^{L-1} \left( \underset{1 \times L}{[1]} \cdot \underset{L \times L}{Y} \cdot \underset{L \times 1}{[1]} \cdot b_i - Y_{i,i} \cdot b_i + n_i \cdot b_i \right) \right|^2} = \quad (12)$$

$$\frac{\left| \underset{1 \times L}{[1]} \cdot \left[ \underset{L \times L}{\mathrm{diag}\, Y} \right] \cdot \underset{L \times 1}{b} \right|^2}{\left| \sum_{i=0}^{L-1} b_i \cdot \left( \underset{1 \times L}{[1]} \cdot \underset{L \times L}{Y} \cdot \underset{L \times 1}{[1]} - Y_{i,1} \right) \right|^2 + \sigma^2 \sum_{i=0}^{L-1} b_i}$$

where $s_0(t)$ and $n_1 = n(t-\tau_1)$ are all uncorrelated and $N_m(0, \sigma^2)$.

The desired forward link pre-correction weights are in the weight matrix, $$\underset{M \times L}{W},$$

that will maximize the received signal CINR. Two such candidates are MRC and OC weights.

The interference to $MP_i$ is defined as:

$$R_{I,i} = \left( \underset{M \times L}{X} \cdot \underset{L \times 1}{[1]} - \underset{M \times 1}{X_i} + \underset{M \times 1}{\vec{n}_i} \right) \cdot \left( \underset{M \times L}{X} \cdot \underset{L \times 1}{[1]} - \underset{M \times 1}{X_i} + \underset{M \times 1}{\vec{n}_i} \right)^H = \quad (13)$$

$$\left( \underset{M \times L}{X} \cdot \underset{L \times 1}{[1]} - \underset{M \times 1}{X_i} \right) \cdot \left( \underset{M \times L}{X} \cdot \underset{L \times 1}{[1]} - \underset{M \times 1}{X_i} \right)^H + \sigma_A^2 \cdot \underset{M \times M}{I}$$

where an equivalent antenna array referred spatial white noise term is introduced, and a complex Gaussian on all the antenna elements, i.i.d. with zero mean and variance equal to $$\sigma_A^2,$$

i.e.

$$N_A \approx (0, \sigma_A^2)$$

is assumed. Typically, $$\sigma_A^2 = \sigma^2,$$

so as to emphasize/de-emphasize interference power relative to the mobile station noise term. However, as there are many interference terms from L MP's, interference rejection may be further emphasized by selecting $$\sigma_A^2 = \frac{\sigma^2}{B},$$

where B is equal to a desired value (B=L or M or other values). The white noise term introduced may be determined in a noise floor estimator 1240 in a mobile station 106, described in further detail with respect to FIG. 12 below.

The OC and MRC normalized weights using Equ. (13) for $MP_i$ may be defined as:

$$OC\ \text{weight}\vec{w}_i = \frac{R_{I,i}^{-1} \cdot \vec{c}_i}{\|w\|} \quad (14)$$

$$MRC\ \text{weight}\vec{w}_i = \frac{\text{diag}(R_{I,i}^{-1}) \cdot \vec{c}_i}{\|w\|} \quad (15)$$

where $$\|w\| = \sqrt{\sum_{i=0}^{L-1} \|w_i\|^2}.$$

The weights defined in Equs. (14, 15) may be used to provide the weights f as described above with respect to pre-correction processor 310. Note that the OC weights are also referred to as Weiner weights.

Note that the choice for the transmit antenna weights are not limited by those suggested in Equs. (14, 15). One such example is a forward link pre-correction algorithm that chooses to transmit full power on only a single multipath at a given time. In such an example, the forward link weights matrix would set the desired MP to have weight with norm one while zeroing out all other multipaths. This example would illustrate a single spot beam forward link pre-correction algorithm. Such a single spot beam forward link pre-correction embodiment is described in further detail with respect to space only pre-correction, below.

Referencing Equs. (9, 11), the OC transmit weights may be used to spatially null transmission in undesirable directions, i.e. null out the off-diagonal elements. Using OC weights in Equs. (11, 12), a combined receive signal at the mobile station would be expected much like:

$$\vec{r}(t) = \underset{1 \times L}{[1]} \cdot \begin{bmatrix} \vec{w}_0^H \vec{c}_0 s_0(t-\tau_0) A_0(\Delta\tau_0) & \varepsilon & \cdots & \varepsilon \\ \varepsilon & \vec{w}_1^H \vec{c}_1 s_0(t-\tau_1) A_1(\Delta\tau_1) & \cdots & \varepsilon \\ \vdots & \vdots & \ddots & \vdots \\ \varepsilon & \varepsilon & \cdots & \vec{w}_{L-1}^H \vec{c}_{L-1} s_0(t-\tau_{L-1}) A_{L-1}(\Delta\tau_{L-1}) \end{bmatrix} \cdot \underset{L \times 1}{b} + n(t) \quad (16)$$

where $\varepsilon$ is ideally zero, although in practice $\varepsilon$ would be related to the background noise and to the cross-correlation of the desired $MP_i$ weight and the undesired $MP_j$ channel vector. Using OC weights alone will not maximize CINR as the on-diagonal elements are not time aligned and continue to represent interference terms in a mobile RAKE design. Thus, the delays, $\tau_1$–$\tau_L$, may be introduced where applicable, as described above.

Space Time Pre-correction

As described above, common among pre-RAKE approaches is dealing with the space and time dimensions of the channel estimates separately. In an alternate embodiment, pre-correction processor 310 derives delays and weights without separating the space and time dimensions of the channel estimates. Such a pre-correction approach is referred to as space-time (ST) pre-correction. In contrast to the multiple distinct transmit beam patterns generated using a pre-RAKE algorithm, the use of an ST pre-correction algorithm results in a single antenna pattern that has sizeable lobes in the directions of, and at appropriate compensating delays for, each of the transmit paths (e.g. 150 and 160).

Figure 9:
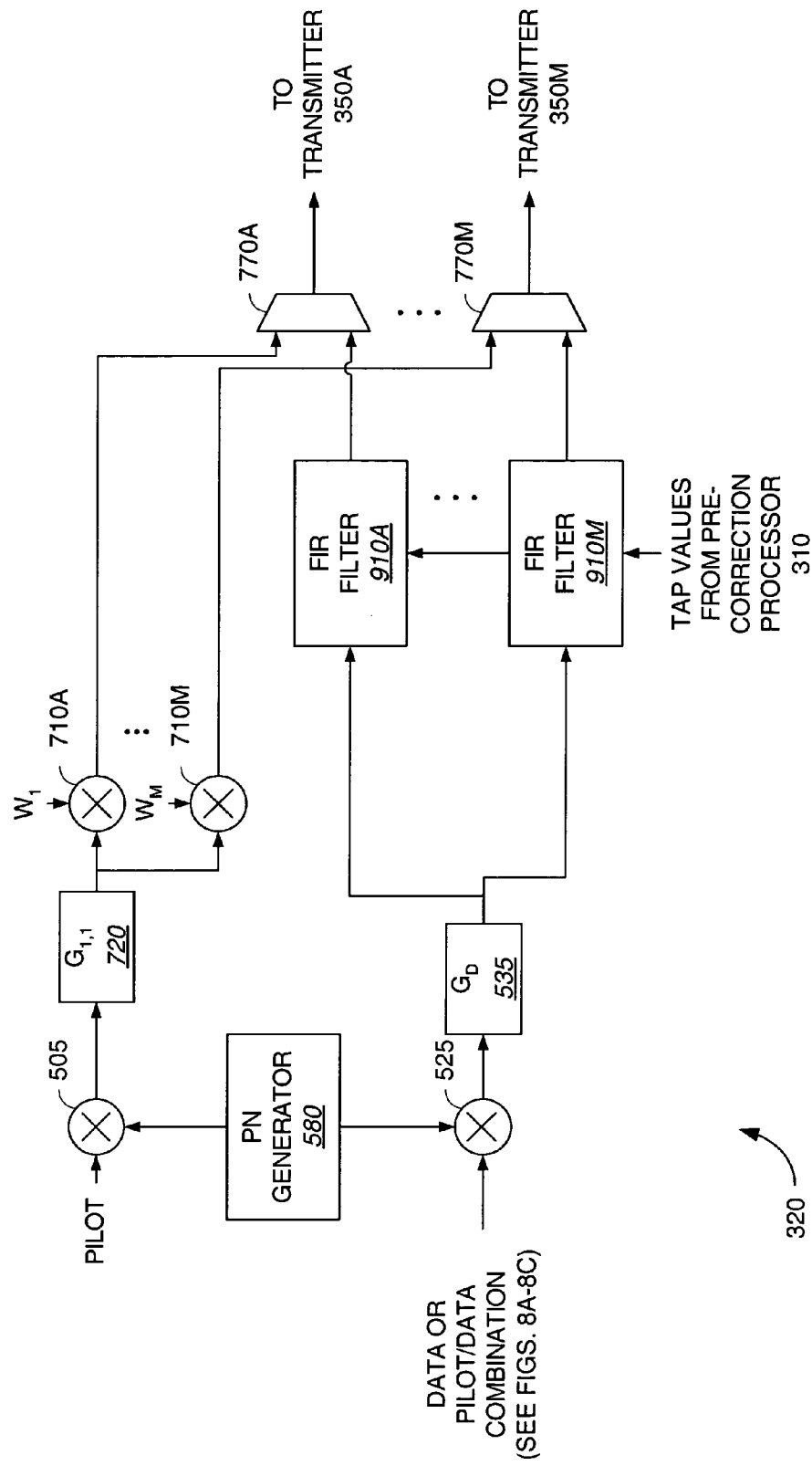
FIG. 9 depicts a signal conditioner for space time pre-correction.

FIG. 9 is an embodiment of a signal conditioner 320 configured for use with space time pre-correction. Transmit formats such as those described with respect to FIGS. 4A and 4C are deployed in this embodiment. As described with respect to FIG. 7, above, pilot signals are spread, optionally gain adjusted, and Walsh covered using blocks 505, 580, 720, and 710. The pilot signals are then multiplexed with MUXes 770A–770M for delivery to transmitters 350A–350M, respectively. Data (or a data/pilot combination, as described above) is spread in spreader 525 in accordance with the PN sequence generated in PN generator 580, optionally gain adjusted in gain block 535, and delivered to M Finite Impulse Response (FIR) filters 910A–910M. Each FIR filter 910A–910M is used to determine the signal for transmission on antennas 110A–110M, via transmitters 350A–350M, respectively. The output of the FIR filters is selected with MUXes 770A–770M, respectively, as described above.

The tap values for the FIR filters are calculated in a pre-correction processor 310 in accordance with a space-time pre-correction technique, an example of which is described below. Filtering techniques are well known in the art, and those of skill will readily adapt various filters and filtering techniques with the principles disclosed herein.

In this embodiment, a full space time weight matrix is deployed to obtain the maximum CINR utilizing the forward link channel state information, which includes the per multipath channel fading coefficients, per multipath time delay, and per multipath signal power to background noise ratio.

In certain circumstances, the multipath time delay is expected to change at a much slower time constant than the fading coefficients of the channel. As with pre-RAKE pre-correction, described above, multipath time delay information may be obtained using the reverse link (i.e., correlation in multipath time delay info between frequencies). However, if the reverse link time delay is not available, the additional multipath time delay channel state information is expected to be a relatively small amount of additional reverse link feedback data.

During this discussion of the theoretical background, a single cell forward link environment is assumed to simplify the analysis. Those of skill in the art will readily apply the principles disclosed to multiple cell, multiple user communication systems of various types, in light of the teaching herein. Furthermore, in a multi-cell environment with a mobile station antenna array, the forward link ST algorithm presented herein increases the effective degrees of freedom of the mobile station array by allowing the mobile station array to concentrate solely on other cell interference terms.

As before, the Pilot and the Data signals are modeled as a common signal to simplify the analysis to give insight into the CINR equations. Depending upon the transmit antenna array 110 configuration, a per antenna or per "beam" pilot may be needed. If different multipath pilots are used, each $MP_j$ Pilot PN should be spread orthogonal to other multipaths $MP_j$ yet still allow the data of all multipaths to add coherently (i.e., with a common PN spread for data on all multipaths). In the following analysis, a single common Pilot PN is used to illustrate the basic principles.

A frequency selective Rayleigh fading channel model, perfect average power control, and perfect estimates of all parameters are assumed in the model. The time resolvable multipath of the user on a power and time delay basis are assumed and each multipath is assumed to be fading and distributed in time un-correlated with other multipaths.

In this analysis, discrete time index n=1:N is used, the desired user is given as signal $s_0(t)$, and the known pilot PN sequence is given as $$\underset{1\times N}{d}.$$

The M antenna by $T_2$ time forward link transmit antenna space time weight matrix is given as $$\underset{M\times T_2}{W},$$

the equivalent M antenna by N time channel state matrix is given as $$\underset{M\times N}{H},$$

and the additive noise at the single receiving antenna mobile station background noise as $$\underset{1\times N}{n}.$$

In the present embodiment, $T_2$, described further below, is related to the number of taps of FIR filters 910, and W determines the weights, or tap values for FIR filters 910.

The linear ST weight solution, $$\underset{M\times T_2}{W},$$

will be selected that minimizes the least square error between the output sequence, $$\underset{1\times N}{\hat{d}},$$

and the input sequence $$\underset{1\times N}{d}.$$

Note that this solution approaches the minimum mean square error solution as the time index N increases to where sufficient estimates of the second order moments are obtained.

Note that, as the additive noise in the mobile station approaches zero, the desired $$\underset{M\times T_2}{W}$$

matrix would be that of a perfect ST equalizer. However, realizable mobile stations have finite noise power and hence the W matrix that will maximize the received signal carrier to interference plus noise ratio (CINR) is one that will trade-off non-perfect equalization relative to the mobile stations background noise.

The single antenna mobile station noise, $$\underset{1\times N}{n},$$

is incorporated into an equivalent noise matrix, $$\underset{M\times N}{B},$$

using an input noise referred model. The combination of H and B is modeled as X

The channel state matrix H is described in more detail in the following paragraphs. The relative time constants in the channel are assumed such that time delays between multipaths, $\tau_0-\tau_1=1/B_{coh}$, are smaller or occur less often than changes in channel vector coefficients, $\Delta T_{chan}=1/B_{Doppler}$. That is, the Doppler bandwidth, $B_{Doppler}$, is much less than the coherence bandwidth of the channel, $B_{coh}$, or $B_{coh}>>B_{Doppler}$.

By definition of $B_{coh}$, the channel state matrix is defined to be wide sense stationary (WSS) in discrete time notation up to time index N or in continuous time notation up to time duration $\Delta T_{chan}=1/B_{Doppler}$. By definition of $B_{Doppler}$, the memory of the channel in discrete time notation is $T_1$, with $T_1<N$, or in continuous time notation is on the order of $\tau_0-\tau_1 1/B_{coh}$. Using these relations for relative time in the system, the channel impulse response and channel state matrix may be defined in more detail.

The continuous time low pass equivalent impulse response of the channel, $h_{M,L}(t,\tau)$, has L independently fading ray paths or multipaths from the M base station transmitting antennas 110 to the mobile terminal receiving antenna 112. Each time resolvable multipath has un-correlated fading parameter $\vec{c}$. The discrete time channel impulse response of the channel is an equivalent discrete time M antenna by $T_1$ time delay matrix, $$h(n), \quad M \times T_1$$

where the time delay of each MP corresponds to a specific column of h(n) (note h(n) has memory of length $T_1$):

$$h_{M,L}(t,\tau) = \sum_{i=0}^{L-1} \vec{c}_i \delta(t-\tau_1) \xrightarrow{DT} h(n)_{M \times T_1} = [\vec{c}_0 \; 0...0 \; \vec{c}_1 \; 0...0 \; \vec{c}_{L-1}] \quad (17)$$

Exciting or convolving the channel impulse response, $$h(n), \quad M \times T_1$$

with a reference waveform, $$d, \quad 1 \times N$$

yields the equivalent M antenna by N channel state matrix $$\underset{1 \times N}{d} * \underset{M \times T_1}{h(n)} = \underset{M \times N}{H}.$$

In the following, the method of Least Squares (LS) is used as a basis to determine the ST weight matrix, W. First, a generalized solution is given, followed by a further detailed solution.

For the general LS Solution, the ideal weight matrix would produce the identity matrix when combined with X. That is, the ideal W is such that:

$$\underset{1 \times N}{d} \cdot W \cdot X = \underset{1 \times N}{\hat{d}} \xrightarrow{W X \rightarrow I_{N \times N}} \underset{1 \times N}{d} \cdot \underset{N \times N}{I} = \underset{1 \times N}{\hat{d}} = \underset{1 \times N}{d} \quad (18)$$

Note, however, that the ideal solution to W depends upon X and that only when X is full rank in the channel state matrix (as the input referred background noise ensures full rank in noise terms) and invertible is the perfect solution to W obtained.

Pursuing a solution to W, the singular value decomposition of X and $X^H$ may be described as:

$$X = V \cdot \Sigma \cdot U^H \quad (19a)$$

$$X^H = U \cdot \Sigma \cdot V^H \quad (19b)$$

where the columns of V (a square unitary matrix) are the right singular vectors of X, the columns of U (a square unitary matrix) are the left singular vectors of X, and $\Sigma$ is a diagonal matrix that has singular values, square root of the eigenvalues of $X \cdot X^H$, along its diagonal with rank r (where r is defined as the number of linearly independent columns of X).

The left and right singular values of X are further described via the eigenvector decompositions:

$$X \cdot X^H = V \cdot \Sigma^2 \cdot V^H \quad (20a)$$

$$X^H \cdot X = U \cdot \Sigma^2 \cdot U^H \quad (20b)$$

Using Equ. (19) and noting the inverse of a unitary matrix is its Hermitian transpose, find the solution to W, using a minimum Euclidean norm criteria, to be the pseudo-inverse of X defined as:

$$W \rightarrow X^{-1} \rightarrow (V \cdot \Sigma \cdot U^H)^{-1} = (U^H)^{-1} \cdot (\Sigma)^{-1} \cdot (V)^{-1} = U \cdot \Sigma^{-1} \cdot V^H \quad (21)$$

$$W = U \cdot \Sigma \cdot V^H \cdot (V \cdot \Sigma^2 \cdot V^H)^{-1} = X^H (X \cdot X^H)^{-1}$$

The combination of W·X is then equal to the projection operator $P_X$, defined as:

$$P_X = X^H \cdot (X \cdot X^H)^{-1} X \quad (22)$$

and is the solution to Equ. (18) that minimizes the LS error between d and $\hat{d}$ and approaches the identity matrix as $W \rightarrow X^{-1}$.

The general solution for the weights, or tap values for FIR filters 910, in Equs. (21,22) maximizes the users CINR using the LS criteria. Additionally, a constraint may be required on maximum total transmit output power such that the norm square of the ST weights be equal to one, i.e. $\|W\|^2 = 1$ (normalized total transmit power).

The detailed solution for the ST weights, i.e., Equs. (18)–(22), is as follows. The input noise referred model is used to ensure the mobile station noise vector is incorporated into X to obtain proper emphasis of interference to background noise mitigation in the determination of W.

X was defined previously as the combination of the channel state matrix W and the equivalent noise matrix B, and the users known reference signal was defined as d. An error term, e, is defined as the difference between the estimate of the desired user's reference signal, $\hat{d}$, and the desired users true reference signal d. The error term, e, is written in matrix notation over m=1:M antennas and n=1:N time samples. We seek to determine the weight matrix, W, with time taps t=1:$T_2$ where $T_1 \leq T_2 \leq N$.

Illustrating X in matrix form as:

$$\underset{M \times N}{X} = [\vec{x}_1 \vec{x}_2 \cdots \vec{x}_N] = \begin{bmatrix} x_{1,1} & x_{1,2} & \cdots & x_{1,N} \\ x_{2,1} & x_{2,2} & \cdots & x_{2,N} \\ \vdots & \vdots & \ddots & \vdots \\ x_{M,1} & x_{M,2} & \cdots & x_{M,N} \end{bmatrix} \quad (23)$$

where $\hat{x}_n$ is a vector of all equivalent antenna samples for time index n, redefine X as x to support matrix convolutions in determining a ST weight matrix with $T_2$ taps:

$$\underset{MT_2 \times N}{X} = \begin{bmatrix} \vec{x}_{1-\frac{T_2-1}{2}} & \vec{x}_{2-\frac{T_2-1}{2}} & \cdots & \vec{x}_{N-1-\frac{T_2-1}{2}} & \vec{x}_{N-\frac{T_2-1}{2}} \\ \vdots & \vdots & \cdots & \vdots & \vdots \\ \vec{x}_1 & \vec{x}_2 & \cdots & \vec{x}_{N-1} & \vec{x}_N \\ \vdots & \vdots & \cdots & \vdots & \vdots \\ \vec{x}_{1+\frac{T_2-1}{2}} & \vec{x}_{2+\frac{T_2-1}{2}} & \cdots & \vec{x}_{N-1+\frac{T_2-1}{2}} & \vec{x}_{N+\frac{T_2-1}{2}} \end{bmatrix} \quad (24)$$

The ST weight matrix W is illustrated as:

$$\underset{M\times T_2}{W} = [\vec{w}_1 \vec{w}_2 \cdots \vec{w}_{T_2}] = \begin{bmatrix} w_{1,1} & w_{1,2} & \cdots & w_{1,T_2} \\ w_{2,1} & w_{2,2} & \cdots & w_{2,T_2} \\ \vdots & \vdots & \ddots & \vdots \\ w_{M,1} & w_{M,2} & \cdots & w_{M,T_2} \end{bmatrix} \quad (25)$$

Redefine W into w, a single column vector format:

$$\underset{MT_2 \times 1}{w} = \begin{bmatrix} \vec{w}_1 \\ \vec{w}_2 \\ \vdots \\ \vec{w}_{T_2} \end{bmatrix} \quad (26)$$

to aid in the matrix analysis of the convolution of W and X

Proceed to define the LS cost function using the orthogonality principle and further define/redefine in more detail the following terms:

$$\text{Desired Response:} \underset{1\times N}{d} = [d_1 d_2 \cdots d_N] \quad (27)$$

$$\text{Estimate of Desired Response:} \underset{1\times N}{\hat{d}} = \text{Trace}(W^H X) = W^H X \quad (28)$$

$$\text{Estimation Error:} \underset{1\times N}{e} = d - \hat{d} = d - W^H X \quad (29)$$

where the coefficients of the ST weight is determined by minimizing the sum of the squared errors:

$$\text{Error Energy:} E = \sum_{n=1}^{N} |e(n)|^2 \quad (30)$$

The ST weight matrix is assumed to be held constant over time $1 \leq n \leq N$.

The on-time estimation space, M-dimensional subspace, is the row space of the matrix X. Clearly, any estimate of $\hat{d}$ for an on-time receive signal must lie in the estimation space. The desired response d, in general, lies outside the estimation space.

In the ST implementation, the estimation space is an $MT_2$-dimensional row space of X. The ST estimation space is composed of the typical M dimensional on-time estimation space plus early/late-time subspaces.

Use the LS error criterion, i.e. the notion that the squared length of e is a minimum when e is orthogonal to the estimation space, i.e.

$$e \perp \underset{1\times N}{X}$$

for $1 \leq i \leq M \cdot T_2$ (orthogonality principle), and write the LS normal equations as:

$$e \perp \underset{1\times N}{X} \xrightarrow{\text{for all } i} \underset{MT_2\times N}{X} \cdot \underset{N\times 1}{e}^H = \underset{MT_2 \times 1}{0} \quad (31)$$

or in more detail as:

$$\underset{MT_2\times N}{X} \cdot \underset{N\times 1}{e}^H = \quad (32)$$

$$\underset{M \cdot T_2 \times N}{X} \cdot \left[ \underset{N\times 1}{d}^H - \underset{N\times M \cdot T_2}{X^H} \cdot \underset{MT_2 \times 1}{W} \right] = \underset{MT_2\times 1}{0} \xrightarrow{\text{yields}} X \cdot X^H \cdot W = X \cdot d^H$$

Assuming that $X \cdot X^H$ is non-singular and invertible, solve for the general LS error ST weight solution as:

$$\underset{MT_2\times 1}{W} = \left( \underset{MT_2\times N}{X} \cdot \underset{N\times MT_2}{X^H} \right)^{-1} \cdot \underset{M \cdot T_2 \times N}{X} \cdot \underset{N\times 1}{d}^H \quad (33)$$

The weight solution in Equ. (33) is similar to Equ. (21) where Equ. (35) incorporates the reference signal.

We then solve for the estimate of the desired response as:

$$\underset{1\times N}{\hat{d}} = \underset{1\times MT_2}{W^H} \cdot \underset{MT_2 \times N}{X} = \underset{1\times N}{d} \cdot \underset{N\times MT_2}{X^H} \left( \underset{MT_2\times N}{X} \cdot \underset{N\times MT_2}{X^H} \right)^{-1} \cdot \underset{M \cdot T_2 \times N}{X} \quad (34)$$

Note that the solution to $\hat{d}$ is that of a desired signal projected onto the row space or estimation space of X, as expected, via the projection operator:

$$\underset{N\times N}{P_X} = \underset{N\times MT_2}{X^H} \left( \underset{MT_2\times N}{X} \cdot \underset{N\times MT_2}{X^H} \right)^{-1} \cdot \underset{MT_2\times N}{X} \quad (35)$$

and note the direct similarity of Equ. (35) and Equ. (22).

As in the general solution, a constraint may be required on maximum total transmit output power such that the norm square of the ST weights be equal to one, i.e. $\|W\|^2 = 1$ (normalized total transmit power).

Space Only Pre-correction

Space only pre-correction may be used when it is undesirable to introduce time offsets into the various paths being transmitted. For example, in a multi-user voice system such as IS-95, the forward link channels are transmitted synchronized such that they maintain orthogonality with each other. It may be that time correction may increase interference to other users, and therefore space only pre-correction will be deployed. In contrast, in a time division multiplexed system such as HDR, where one user at a time accesses the entire channel, the benefits of space and time pre-correction may be deployed without negative effects to other users.

In space only pre-correction, no delays are introduced into the various paths being transmitted. In the present embodiment, the weights f are selected as follows. The pre-correction processing, such as any of the methods described above for use in pre-correction processor 310, may be used to evaluate each of the multipaths received at the mobile station 106. Then, instead of applying the calculated weights to each path, as described above with respect to FIGS. 5–9, the single best path is selected. All the transmit power available to that user will be transmitted on the single best path. The weights for the selected path will be normalized according to the available transmit power and applied for transmission on the antennas 110.

Thus, to apply space only pre-correction in an embodiment such as that depicted in FIG. 5, the gain blocks 520 for all paths except one may be set to zero, to remove the pilots for the unused paths. Then, the normalized weights, divided by L, will be applied to each multiplier 550. The division by L is due to the resulting sum of L paths, or equivalent re-multiplication of the data and pilots by L in summers 540. The delays in delay blocks 560 may be set to zero, or some other convenient constant, to avoid any inter-path delay. The rest of the processing occurs as described above with respect to FIG. 5. Those of skill in the art will recognize this, and other means for deploying an embodiment such as depicted in FIG. 5 for use with space only pre-correction, all within the scope of the present invention.

Figure 10:
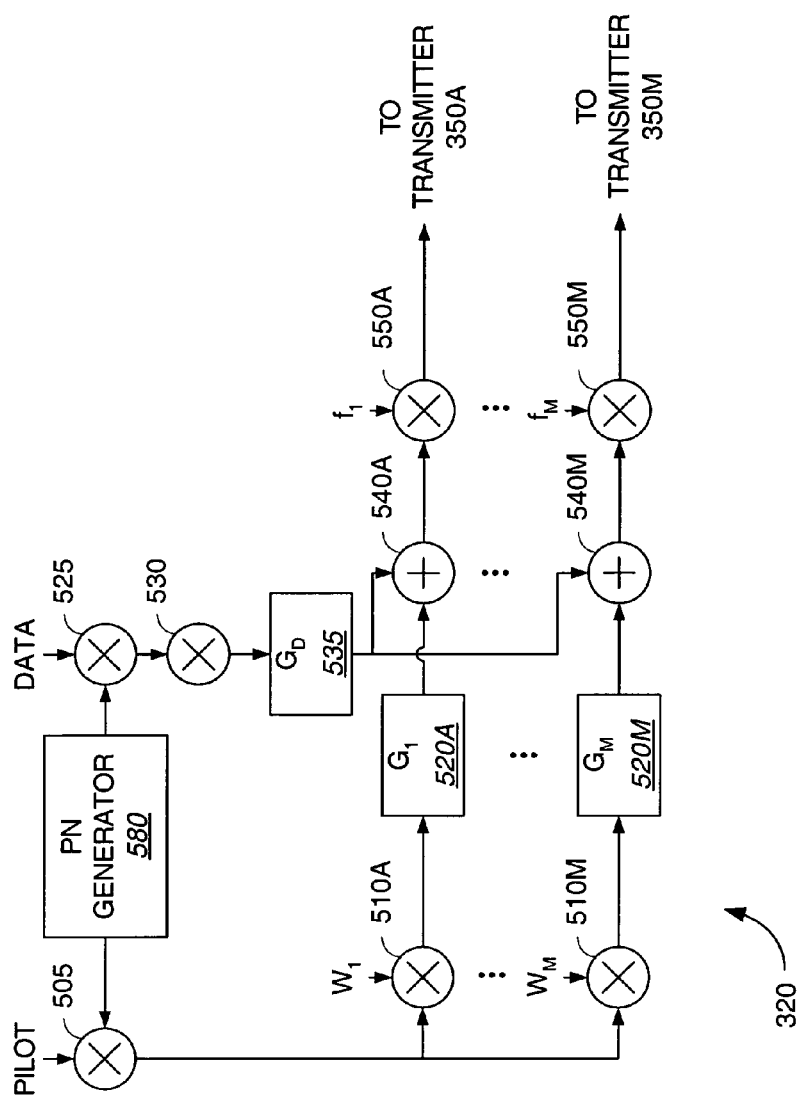
FIG. 10 depicts a signal conditioner for space only pre-correction for use with simultaneously transmitted pilot and data.

Alternatively, an embodiment such as depicted in FIG. 10 may be deployed. In this embodiment, only a subset of pilot codes W are required, one to identify each antenna, for creating pilots in Walsh covers 510. The corresponding optional gain blocks 520 are also a reduced set. The pilots and data are summed, as before, in a reduced set of summers 540. The pilot and data are then multiplied by the weights f in multipliers 550, a reduced set corresponding to one for each antenna. Since only a single path is used, delay blocks 560 and summers 570 are omitted. The rest of the processing proceeds as described above with respect to FIG. 5. FIG. 10 is an example of a signal conditioner suitable for space only pre-correction. FIG. 5 is an example of a signal conditioner suitable for either space-time or space only pre-correction.

Figure 11:
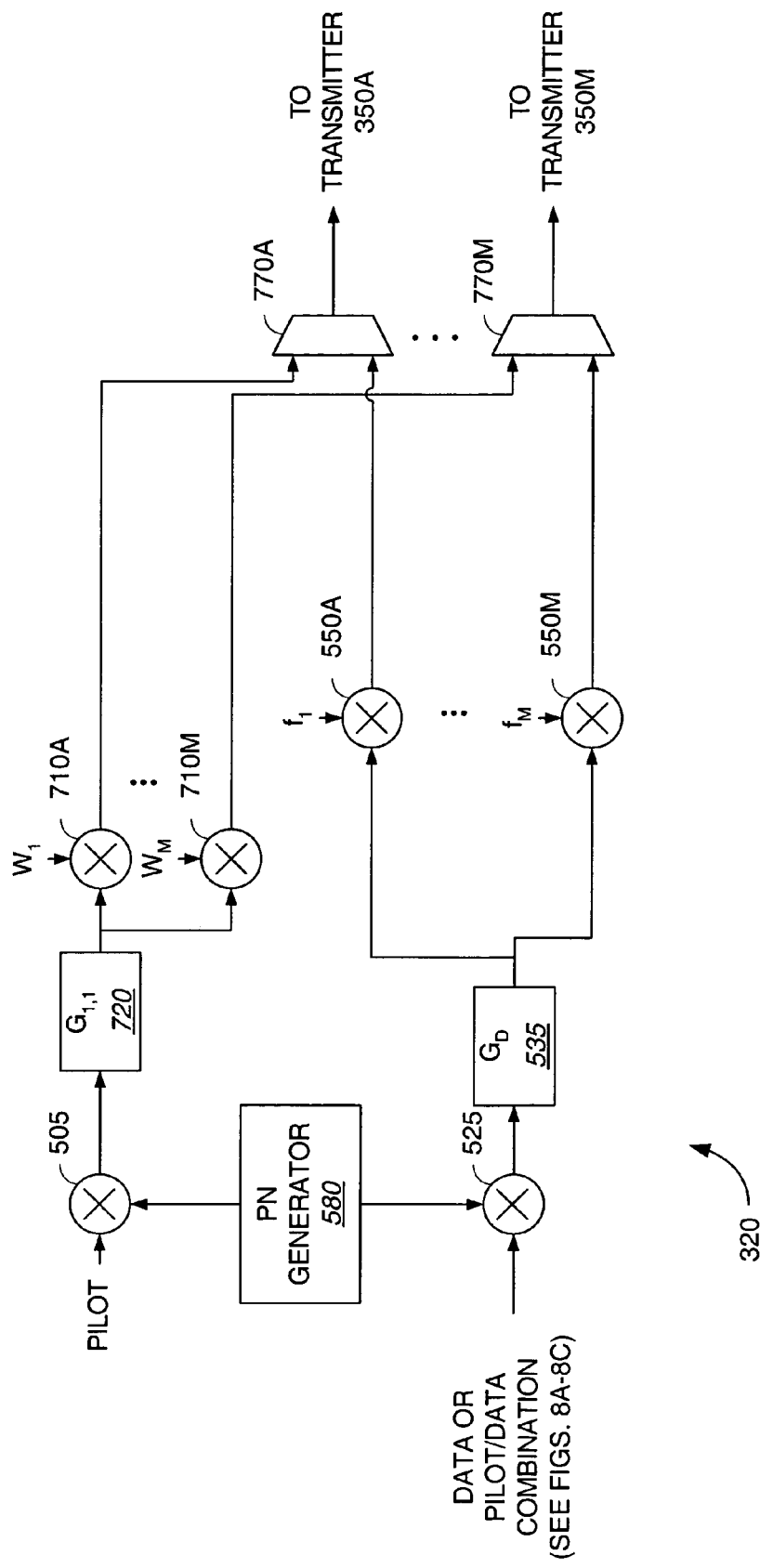
FIG. 11 depicts a signal conditioner for space only pre-correction for use with pre-corrected data and pilot bursts.

Similarly, to apply space only pre-correction in an embodiment such as that depicted in FIG. 7, a delay of zero, or some other convenient constant is applied in each delay block 760. Then, the normalized weights, divided by L, will be applied to each multiplier 550. The division by L is due to the resulting sum of L paths, or re-multiplication by L in summers 570. Alternatively, an embodiment such as depicted in FIG. 11 may be deployed. The embodiment in FIG. 11 is identical to that in FIG. 7, except that delay blocks 760 are removed, only a single bank of M multipliers are deployed (one for each antenna, for a single path), and summers 570 may be removed since each antenna transmits the single path only. The weights f applied to multipliers 550 do not need to be divided by L, as in the embodiment of FIG. 7. FIG. 11 is an example of a signal conditioner suitable for space only pre-correction. FIG. 7 is an example of a signal conditioner suitable for either space-time or space only pre-correction. Those of skill in the art will recognize these, and other means for deploying an embodiment such as depicted in FIG. 7 or FIG. 11 for use with space only pre-correction, all within the scope of the present invention.

Figure 12:
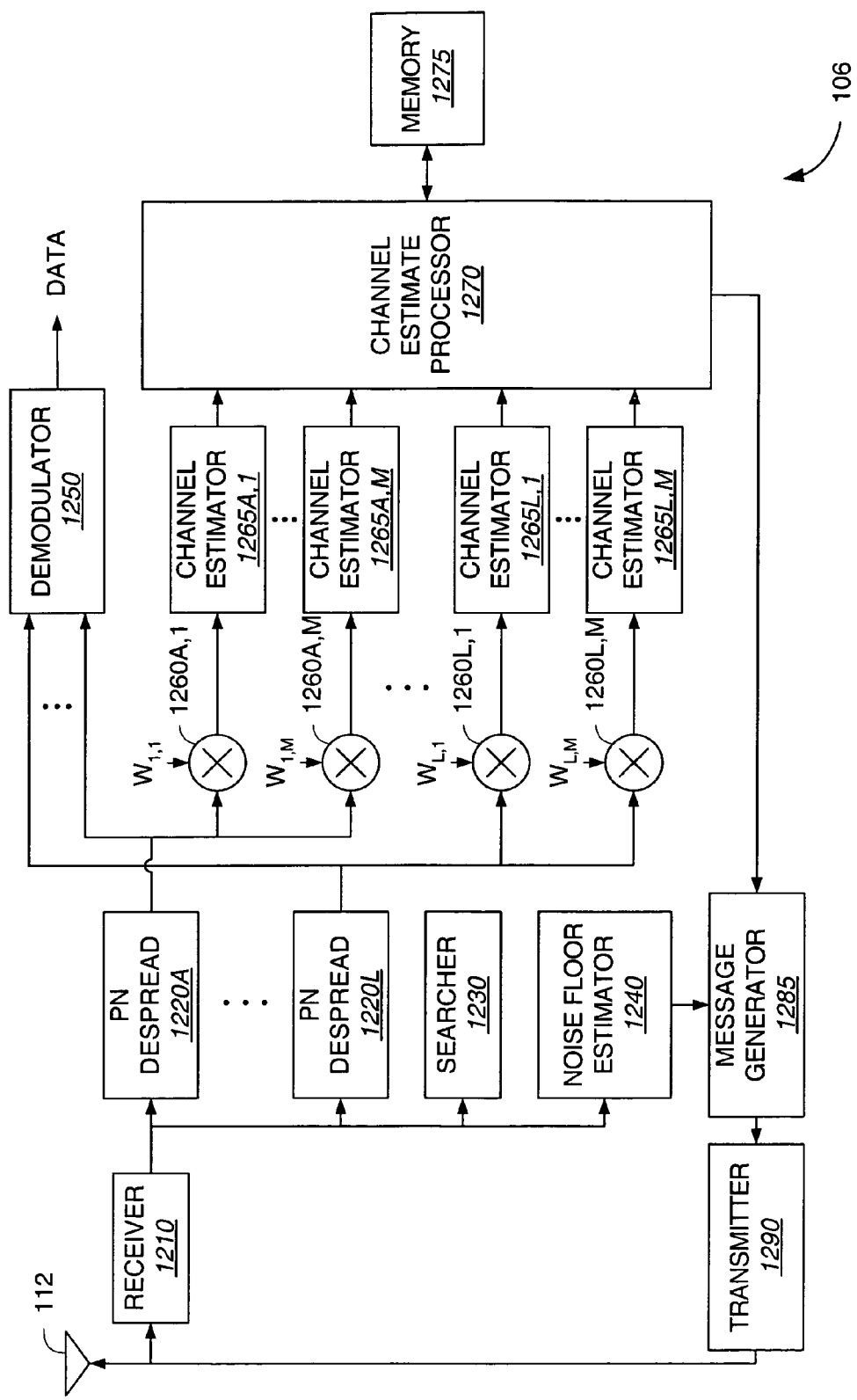
FIG. 12 depicts one embodiment of a mobile station.

FIG. 12 depicts a present embodiment of a mobile station 106, configurable for deployment with base station 104 and any of the signal conditioners 320, described above. Signals are received at antenna 112 (which may be a single antenna, or an array of diversity antennas for deploying diversity techniques known in the art). The received signal is conditioned in receiver 1210, using techniques appropriate for one or more communication systems compatible with mobile station 106, such as those described above. Examples of conditioning include amplification, filtering, down conversion, analog to digital conversion, and other techniques known in the art.

The conditioned signal from receiver 1210 is delivered to searcher 1230, which identifies one or more received multipaths from one or more base stations 104. The results of searcher 1230 may be used to assign offsets to the PN despreaders 1220A–L.

When space time pre-correction is deployed, such as described above with respect to FIGS. 3–9, PN despreaders 1220A–L may be configured to despread the L transmitted multipaths. Note that the actual received multipaths in any given channel condition may be more or less than L, but L paths are controllable as described above. In the present embodiment, offsets in the transmitted PN sequence (including a component due to the multipath in the channel, as well as any introduced pre-correction) may be accounted for in PN despreaders 1220. Those of skill in the art will recognize other types of coding that may be used equivalently. When pre-correction is operating at maximum efficiency, all the L multipaths will arrive time aligned and in-phase at the mobile station 106, SO the offset in each PN despreader 1220 will be identical. As the channel changes, the pre-correction algorithm will adapt, and various offsets may need to be introduced into the despreaders 1220. The output of PN despreaders 1220 may be delivered to demodulator 1250 for demodulation using various techniques known in the art, examples of which are detailed below.

The output of PN despreaders 1220 is also delivered for channel estimation, as described in the following. For each of the L paths, the output of one PN despreader 1220 (A through L respectively) is delivered to a bank of M Walsh decovers 1260. When pre-correction is applied to the combined pilot and data signal, as described above with respect to FIG. 5 (or FIG. 10 when space only pre-correction is deployed), the Walsh codes W for Walsh decovers 1260 correspond to the M*L Walsh codes used in Walsh covers 510. Thus, Walsh covers $W_{1,1}$–$W_{1,M}$, respectively, are used to isolate the M antenna specific pilots for the first path. Similarly, $W_{L,1}$–$W_{L,M}$ are used to isolate the M antenna specific pilots for the $L^{th}$ path. When pre-correction is applied to the data only, and the M antenna-specific pilots are multiplexed with the pre-corrected data, such as described above with respect to FIG. 7 (or FIG. 11 when space only pre-correction is deployed), there are only M Walsh covers for applying to Walsh decovers 1260. In either case, Walsh decovers 1260 produce M*L pilot sequences, respectively, for delivery to channel estimators 1265. Channel estimators 1265 produce estimates of the phase and magnitude of the pilots corresponding to the component of each of the M antennas contributing to each of the L paths. The channel estimates are delivered to channel processor 1270.

Some or all of the functions of channel estimate processor 1270, channel estimators 1265, demodulator 1250, or any of the other blocks described herein with respect to FIG. 12 may be carried out in one or more general or special purpose processors (such as a Digital Signal Processor (DSP)), co-processors, special purpose hardware, or a combination of the above. Those of skill in the art will recognize myriad combinations of these and other components that may be deployed without deviating from the principles of the invention disclosed herein. Channel estimate processor 1270 may contain, or be connected with, one or more memory elements 1275 for storing instructions to carry out the various tasks and processes described herein, as well as for data storage.

Conditioned signals from receiver 1210 are also delivered to noise floor estimator 1240 for calculation of a noise floor estimate, which is used in the pre-correction techniques described above. Those of skill in the art will recognize that a noise floor estimate may be made in receiver 1210, or demodulator 1250, or in a variety of other components deployed within a mobile station 106. A separate block is depicted for clarity of discussion only. The channel estimates generated in channel estimate processor 1270 and the noise floor estimator 1240 are delivered to message generator 1285. Message generator 1285 generates signals or messages for relaying the channel and noise estimates to one or more base stations 104 through transmitter 1290 and antenna 112. Note that path delay information may be determined using searcher 1230, PN despreaders 1220, or any other technique known in the art (for example, fingers in a RAKE receiver may be used to determine delays of various paths). The messages or signals may be generated according to any format, examples of which are given in the system standards described above. Transmitter 1290 conditions data for transmission in accordance with one or more supported system standards. Examples of conditioning include various types of encoding, interleaving, framing, filtering, amplification, digital to analog conversion, RF upconversion, and the like.

Note that in an alternative embodiment (details not shown), a pre-correction processor, such as any pre-correction processor 310 described above, may be deployed within the mobile station instead of or in addition to one deployed in the base station 104. In this alternative, the channel and noise estimates are delivered to the pre-correction processor, weights and/or delays are calculated and transmitted to the base station via message generator 1285, transmitter 1290, and antenna 112. Those of skill in the art will recognize the various trade-offs associated with signaling computed parameters rather than estimate information as well as distributing computing power between the mobile stations 106 and base stations 104.

Demodulator 1250 receives the output from one or more PN despreaders 1220 and demodulates those signals to produce the desired data, using any of the various techniques known in the art. Examples of demodulation techniques that may be deployed, many of which will be selected based upon the system standard currently being used for communication, include various types of decoding, deinterleaving, etc. When pre-correction is operating optimally, all the multipath signals will arrive at the mobile station 106 time aligned and in correct phase such that the signals may be combined and coherently demodulated with one or more of the pilots that arrive in phase with the data. However, any given pre-correction processor, in conjunction with any given channel, may still allow for more than one multipath to arrive at the mobile station with sufficient energy useful for demodulation. As such, the present embodiment deploys a RAKE receiver in demodulator 1250 to take advantage of any residual multipath not pre-corrected.

When the signals arrive time-aligned at the mobile station, the output of a single PN despreader may be delivered to demodulator 1250, which may or may not deploy a RAKE receiver. Alternatively, all the outputs of despreaders 1220 may be used. The various PN despreaders 1220 may be used in conjunction with a RAKE receiver in demodulator 1250, or may be shared therewith.

Figure 13A:
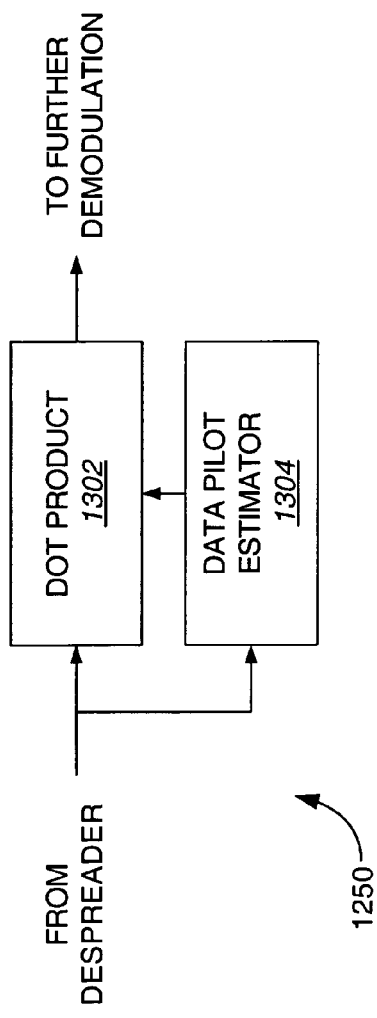
FIGS. 13A and 13B depict portions of demodulators.

FIG. 13A shows a portion of a demodulator 1250. The portion shown may be part of one finger of a RAKE receiver in the demodulator (details not shown). A signal from a despreader 1220 is delivered to data pilot estimator 1304, where an estimate is made of the data pilot. Data pilot estimator 1304 may operate on one or more despread, decovered pilots, such as one or more outputs from Walsh covers 1260, or from channel estimators 1265. Data pilot estimator 1304 may compute a pilot estimate from each of the per-antenna pilots sent. The estimated data pilot may be used in dot product block 1302 with the despread signal for coherent demodulation, with the result delivered for further demodulation, as necessary.

Figure 13B:
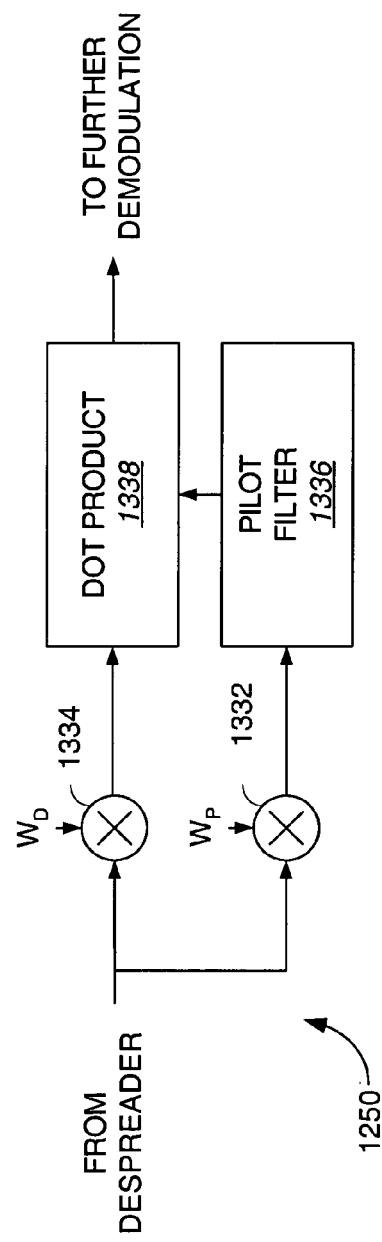

If a continuous pilot is transmitted, such as described above with respect to FIG. 4B, or during the data portion 402, as described above with respect to FIG. 4C, a portion of a demodulator 1250 may be deployed as shown in FIG. 13B. The despread signal is delivered to Walsh decovers 1332 and 1334 to decover the pilot and data portions, respectively. The decovered pilot may be filtered in a pilot filter 1336, with the result delivered for dot product calculation with the decovered data in dot product block 1338. The result may be delivered for further demodulation. The result of pilot filter 1336 may also be combined other pilot information, such as that transmitted during pilot phase 406 as depicted in FIG. 4C.

Figure 14:
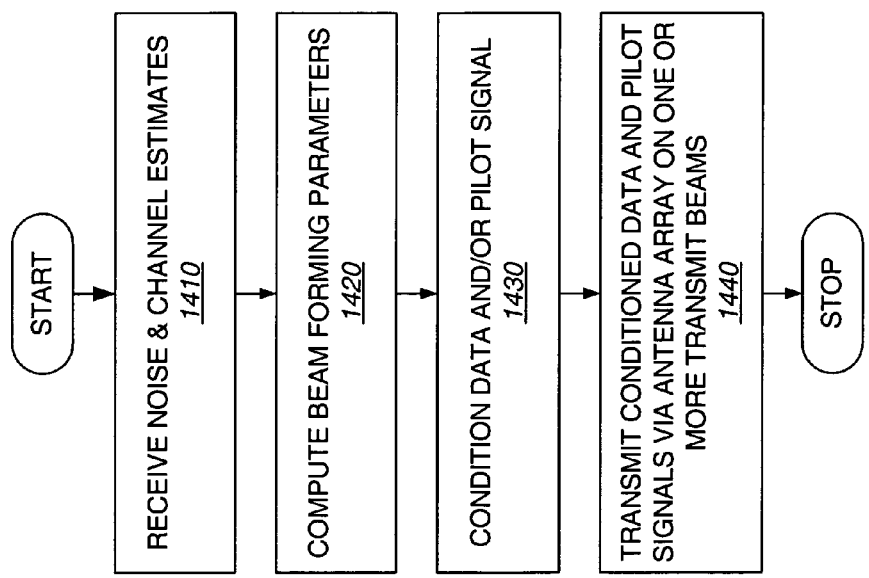
FIG. 14 depicts a flowchart of an embodiment of a method of transmission, adaptable for use with any of the embodiments described herein.

FIG. 14 depicts an embodiment of a method of transmission, adaptable for use with any of the embodiments described herein. The process starts in block 1410, where a base station receives noise and channel estimates from a mobile station. Proceed to step 1420. In step 1420, compute the beam forming parameters required for the desired pre-correction. Any of the techniques for use in a pre-correction processor 310, described above, may be used in step 1420. For example, if pre-RAKE pre-correction is used, the conditioning weights may be calculated according to the Weiner (optimal combining) or maximal ratio combining equations, detailed above, i.e. Equs. (14, 15). Alternatively, if space-time pre-correction is deployed, the tap values may be calculated as described above, i.e., Equs. (21–22) and (33–35).

Figure 15:
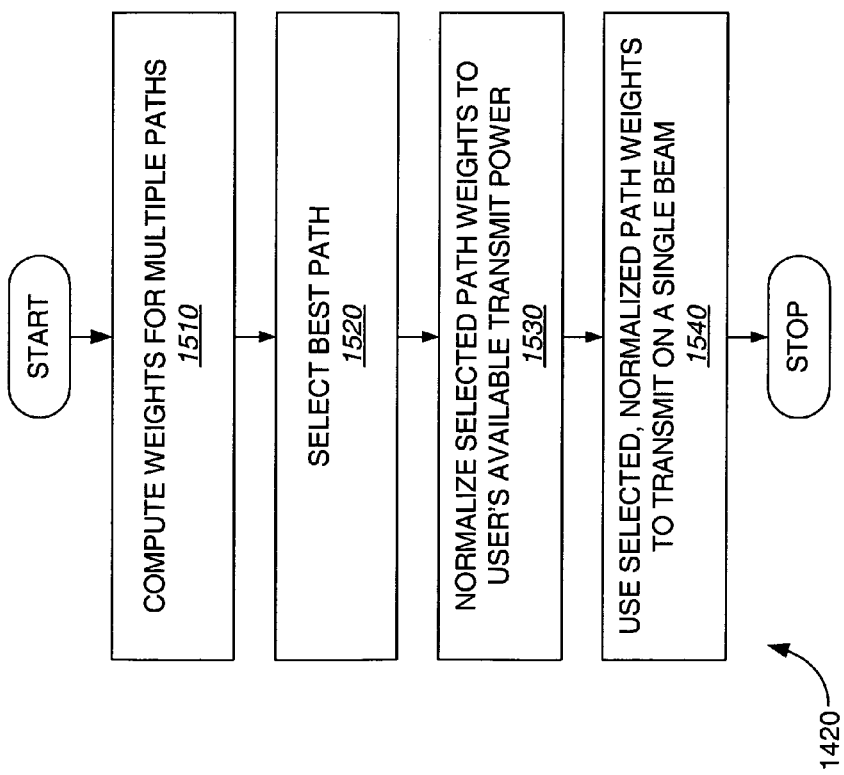
FIG. 15 depicts a flowchart of an embodiment of a method of computing beam forming parameters for use with space only pre-correction.

FIG. 15 depicts an embodiment of a method of computing beam-forming parameters for use with space-only pre-correction, such as in step 1420 described above. The process starts in block 1510, where weights are computed for multiple paths. These weights may be computed according to the Weiner or MRC equations described above. Proceed to step 1520 to select the best path of the multiple paths. In one embodiment this entails selecting the path with the maximum weights. Proceed to step 1530. In step 1530, normalize the selected path weights to the user's available transmit power. Proceed to step 1540. In step 1540, the selected, normalized path weights are used to transmit on a single beam. The user's entire transmit power will be used for transmission, and naturally no delay needs to be introduced.

Figure 16:
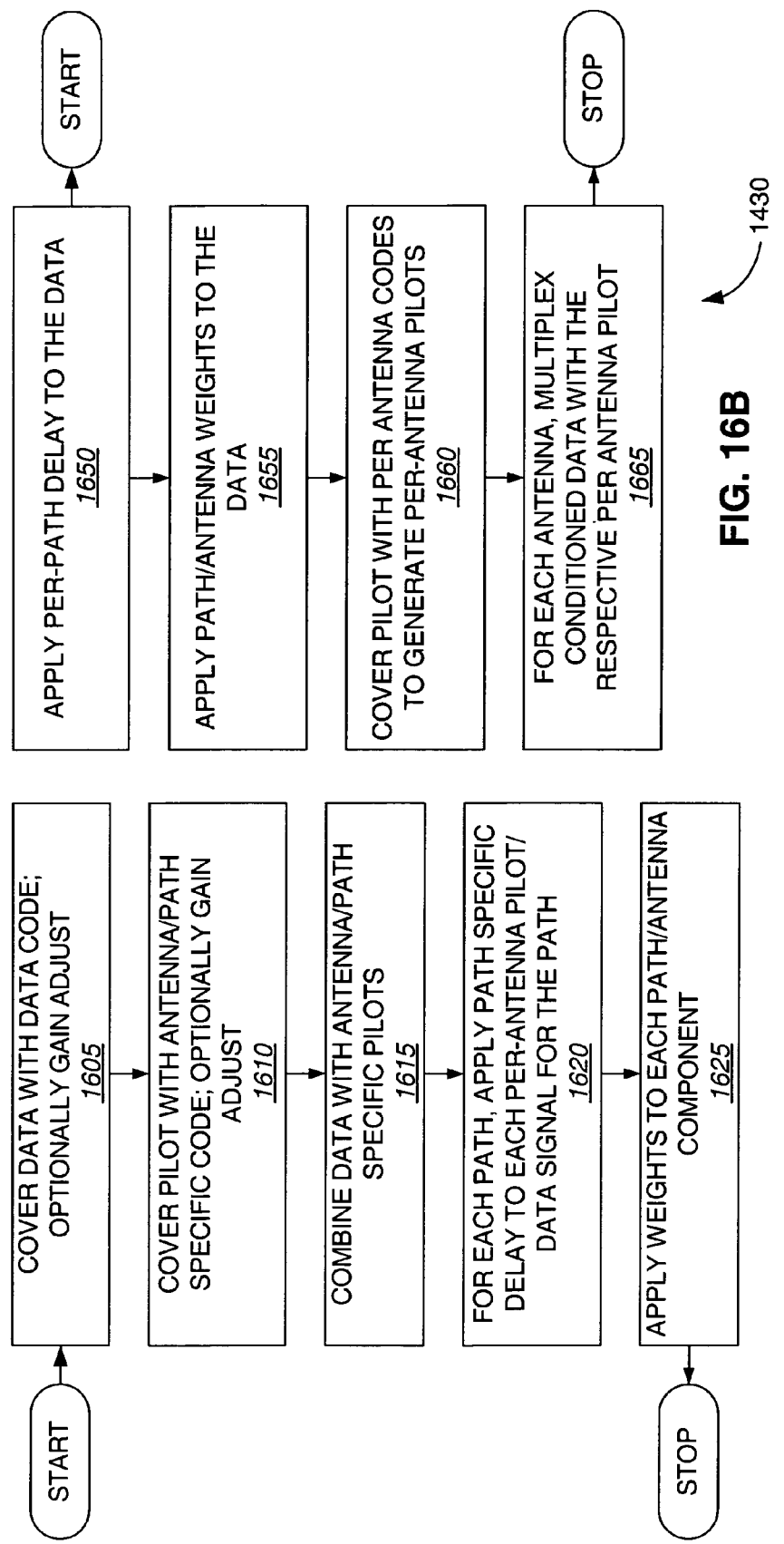
FIGS. 16A and 16B depict embodiments of methods of signal conditioning.

Returning to FIG. 14, once the parameters have been computed, proceed to step 1430. In step 1430 the data and/or the pilot signal is conditioned. Any of the techniques described above for signal conditioning may be deployed. FIGS. 16A and 16B depict embodiments of methods of signal conditioning, which may be used in step 1430.

FIG. 16A depicts a method suitable for use with a continuously transmitted pilot, such as that described in FIG. 4B above. Start at step 1605, and cover the data with a data code. The data may optionally be gain adjusted. Proceed to step 1610 to cover the pilot with an antenna and path specific code for each antenna/path pair. Each covered pilot may be optionally gain adjusted. Proceed to step 1615 to combine the data with each of the antenna/path specific pilots. Proceed to step 1620. In step 1620, for each path, a path-specific delay is applied to each per-antenna pilot/data combination for that path. Proceed to step 1625 to apply the weights, computed in step 1420, for example, to each path/antenna component.

FIG. 16B depicts a method suitable for use with pilot burst signal such as described in FIGS. 4A and 4C, above. Start at step 1650 and apply a per-path delay to the data to form a data stream for each path. Proceed to step 1655 to apply path/antenna weights, such as those computed in step 1420, to each antenna component of each path. Proceed to step 1660, where the pilot is covered with per-antenna codes to form per-antenna pilots. Proceed to step 1665 where, for each antenna, the conditioned data is multiplexed with the respective per-antenna pilot.

When space only pre-correction is used, the embodiments of FIGS. 16A or 16B may be modified to produce a space only step 1430. Those of skill in the art will recognize how to remove the delay steps and apply weights to a single path.

Returning to FIG. 14, once the data and/or pilot signal has been conditioned in step 1430, proceed to step 1440. In step 1440, the conditioned data and pilot signals may be transmitted via the antenna array on one or more transmit beams.

Figure 17:
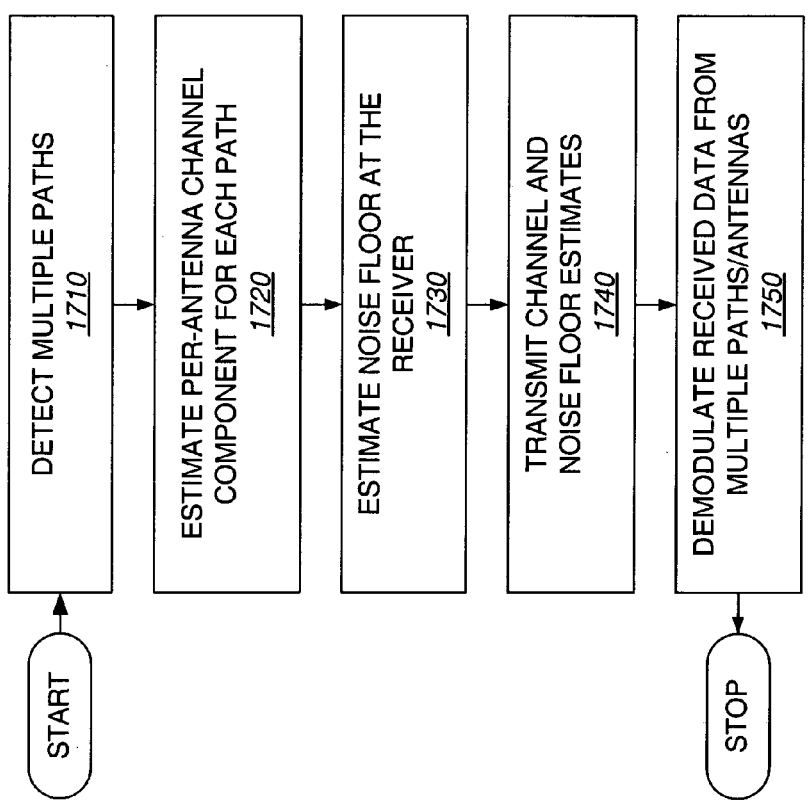
FIG. 17 depicts a flowchart of an embodiment of a method of receiving, adaptable for use with any of the embodiments described herein.

FIG. 17 depicts an embodiment of a method of receiving, adaptable for use with any of the embodiments described herein. The process starts at step 1710, where multiple paths are detected. This may be accomplished using a searcher, such as searcher 1230, described above. In some embodiments, as described above, the multipaths may arrive time-aligned due to pre-correction, so identifiable pilots may be needed to detect the various paths.

Proceed to step 1720. Estimate the per-antenna channel component for each path. In an embodiment in which pilot and data are transmitted simultaneously, and have the weights and delays, as applicable, applied to both, the antenna/path specific codes may be used to determine the component of each path contributed by each antenna. An estimate of each of these channel components may be made, as described above with respect to channel estimators 1265.

Proceed to step 1730. Estimate the noise floor at the receiver. Proceed to step 1740, transmit the channel estimates (which may include phase, amplitude, and delay information) and the noise floor estimate to the corresponding base station. Proceed to step 1750. Demodulate the received data from the multiple paths and antennas.

Note that in the embodiments detailed throughout this description, various components for signal conditioning and the like, such as PN spreaders, receive complex inputs and generate complex outputs having real and imaginary components. In one embodiment, each transmitter 350 treats complex input signals as quaternary phase shift keying (QPSK) signals for purposes of upconversion and transmission. For example, the real components of an input signal would be upconverted as in-phase components by multiplication by a cosine carrier, and the imaginary components would be upconverted as quadrature-phase components by multiplication by a sine carrier. Then, for example, the resulting in-phase and quadrature-phase signals could be summed in a summer before being amplified and transmitted through antennas 110.

Note that the foregoing discussion has used the signals, codes and parameters defined in the 1xEV-DV standard as some of the signals, codes and parameters. This is for clarity of discussion only, and should not be construed to limit the scope of the present invention to 1xEV-DV systems. The principles of the present invention apply to any conceivable system in which pre-correction may be deployed, as described above. Those skilled in the art will recognize how to adapt the various embodiments described for use with such alternate systems.

It should be noted that in all the embodiments described above, method steps may be interchanged without departing from the scope of the invention.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus, operable with a plurality of antennas, each antenna for transmitting one of a plurality of conditioned signals, each of the conditioned signals generated by conditioning an information signal in accordance with one of a plurality of parameter sets, the apparatus comprising:
   a pre-correction processor for generating the plurality of parameter sets in response to a plurality of channel estimates and a noise floor estimate,
   wherein the plurality of parameter sets comprises a plurality of weighting factors, each weighting factor corresponding to one of a plurality of antenna/path pairs, where each antenna/path pair is associated with one of the plurality of antennas and one of a plurality of transmitted paths,
   wherein the plurality of parameter sets further comprises a plurality of delay values, each delay value associated with one of the plurality of transmitted paths, and
   wherein the apparatus further comprises
   a plurality of delay elements, each delay element for delaying the information signal in response to one of the plurality of delay values to produce a plurality of path signals;
   a plurality of multipliers, each multiplier for weighting one of the plurality of path signals in response to one of the plurality of weighting factors, to produce a plurality of weighted path signals for each of the plurality of antennas; and
   a plurality of summers, each summer for summing the plurality of weighted path signals corresponding to one of the plurality of antennas to produce one of the plurality of conditioned signals.

2. The apparatus of claim 1, wherein the channel estimates comprise amplitude and phase estimates of a plurality of paths for each antenna.

3. The apparatus of claim 2, wherein the channel estimates further comprise delay estimates of each path.

4. The apparatus of claim 1, further comprising a message decoder for decoding a message received in response to the transmitted signals, the message comprising the plurality of channel estimates and the noise floor estimate.

5. The apparatus of claim 1, wherein the weighting factors are Weiner weights computed in response to the channel estimates and the noise floor estimate.

6. The apparatus of claim 1, wherein the weighting factors are Maximal Ratio Combining weights computed in response to the channel estimates and the noise floor estimate.

7. The apparatus of claim 1, wherein the plurality of parameter sets comprises a plurality of delay values, each delay value associated with one of a plurality of transmitted paths.

8. The apparatus of claim 1, further comprising:
   a plurality of pilot generators for producing a plurality of per-antenna pilots from a common pilot; and
   a selector for selecting between the plurality of per-antenna pilots and the plurality of conditioned signals, for transmission, respectively, on each of the plurality of antennas.

9. The apparatus of claim 1, further comprising:
   a plurality of pilot generators for producing a plurality of per-antenna/per-path pilots from a common pilot;
   a first plurality of summers, each first summer for summing one of the per-antenna/per-path pilots with the information signal to produce one of a plurality of per-antenna/per-path signals;
   a plurality of multipliers, each multiplier for weighting one of the per-antenna/per-path signals in response to one of the plurality of weighting factors, to produce a plurality of weighted per-antenna/per-path signals;
   a plurality of delay elements, each delay element for delaying one of the weighted per-antenna/per-path signals in response to one of the plurality of delay values to produce a plurality of delayed per-antenna/per-path signals;
   a second plurality of summers, each second summer for summing the plurality of delayed per-antenna/per-path signals corresponding to one of the plurality of antennas to produce one of the plurality of conditioned signals.

10. The apparatus of claim 1, wherein the plurality of parameter sets comprises a plurality of weighting factors, each weighting factor corresponding to one of the plurality of antennas.

11. The apparatus of claim 10, wherein the weighting factors are Weiner weights computed in response to the channel estimates and the noise floor estimate.

12. The apparatus of claim 10, wherein the weighting factors are Maximal Ratio Combining weights computed in response to the channel estimates and the noise floor estimate.

13. The apparatus of claim 10, further comprising:
    a plurality of multipliers, each multiplier for weighting the information signal in response to one of the plurality of weighting factors, to produce one of the plurality of conditioned signals.

14. The apparatus of claim 13, further comprising:
    a plurality of pilot generators for producing a plurality of per-antenna pilots from a common pilot; and
    a selector for selecting between the plurality of per-antenna pilots and the plurality of conditioned signals, for transmission, respectively, on each of the plurality of antennas.

15. The apparatus of claim 10, further comprising:
    a plurality of pilot generators for producing a plurality of per-antenna pilots from a common pilot;
    a plurality of summers, each summer for summing one of the per-antenna pilots with the information signal to produce one of a plurality of per-antenna signals;
    a plurality of multipliers, each multiplier for weighting one of the per-antenna signals in response to one of the plurality of weighting factors, to produce one of the plurality of conditioned signals.

16. The apparatus of claim 1, wherein the plurality of parameter sets comprises tap values for a plurality of Finite Impulse Response (FIR) filters.

17. The apparatus of claim 16, wherein the tap values are space time pre-correction values computed in response to the channel estimates and the noise floor estimate.

18. The apparatus of claim 16, further comprising a plurality of FIR filters for filtering the information signal in response to the plurality of tap values, the output of each FIR filter producing one of the plurality of conditioned signals.

19. The apparatus of claim 18, further comprising:
    a plurality of pilot generators for producing a plurality of per-antenna pilots from a common pilot; and a selector for selecting between the plurality of per-antenna pilots and the plurality of conditioned signals, for transmission, respectively, on each of the plurality of antennas.

20. An apparatus, operable with a plurality of antennas, each antenna for transmitting one of a plurality of conditioned signals, each of the conditioned signals generated by conditioning an information signal in accordance with one of a plurality of parameter sets, the apparatus comprising:

a message decoder for decoding a message received in response to the transmitted signals and to a plurality of channel estimates, the message comprising the plurality of parameter sets and a noise floor estimate, wherein the plurality of parameter sets comprises a plurality of weighting factors, each weighting factor corresponding to one of a plurality of antenna/path pairs, where each antenna/path pair is associated with one of the plurality of antennas and one of a plurality of transmitted paths, wherein the plurality of parameter sets further comprises a plurality of delay values, each delay value associated with one of the plurality of transmitted paths, and wherein the apparatus further comprises a plurality of delay elements, each delay element for delaying the information signal in response to one of the plurality of delay values to produce a plurality of path signals;

a plurality of multipliers, each multiplier for weighting one of the plurality of path signals in response to one of the plurality of weighting factors, to produce a plurality of weighted path signals for each of the plurality of antennas; and a plurality of summers, each summer for summing the plurality of weighted path signals corresponding to one of the plurality of antennas to produce one of the plurality of conditioned signals.

21. A wireless communication device, operable with a plurality of antennas, each antenna for transmitting one of a plurality of conditioned signals, each of the conditioned signals generated by conditioning an information signal in accordance with one of a plurality of parameter sets, the wireless communication device comprising:

a pre-correction processor for generating the plurality of parameter sets in response to a plurality of channel estimates and a noise floor estimate, wherein the plurality of parameter sets comprises a plurality of weighting factors, each weighting factor corresponding to one of a plurality of antenna/path pairs, where each antenna/path pair is associated with one of the plurality of antennas and one of a plurality of transmitted paths, wherein the plurality of parameter sets further comprises a plurality of delay values, each delay value associated with one of the plurality of transmitted paths, and wherein the wireless communication device further comprises a plurality of delay elements, each delay element for delaying the information signal in response to one of the plurality of delay values to produce a plurality of path signals;

a plurality of multipliers, each multiplier for weighting one of the plurality of path signals in response to one of the plurality of weighting factors, to produce a plurality of weighted path signals for each of the plurality of antennas; and a plurality of summers, each summer for summing the plurality of weighted path signals corresponding to one of the plurality of antennas to produce one of the plurality of conditioned signals.

22. A wireless communication system, including a wireless communication device, operable with a plurality of antennas, each antenna for transmitting one of a plurality of conditioned signals, each of the conditioned signals generated by conditioning an information signal in accordance with one of a plurality of parameter sets, the wireless communication device comprising:

a pre-correction processor for generating the plurality of parameter sets in response to a plurality of channel estimates and a noise floor estimate, wherein the plurality of parameter sets comprises a plurality of weighting factors, each weighting factor corresponding to one of a plurality of antenna/path pairs, where each antenna/path pair is associated with one of the plurality of antennas and one of a plurality of transmitted paths, wherein the plurality of parameter sets further comprises a plurality of delay values, each delay value associated with one of the plurality of transmitted paths, and wherein the wireless communication device further comprises a plurality of delay elements, each delay element for delaying the information signal in response to one of the plurality of delay values to produce a plurality of path signals;

a plurality of multipliers, each multiplier for weighting one of the plurality of path signals in response to one of the plurality of weighting factors, to produce a plurality of weighted path signals for each of the plurality of antennas; and a plurality of summers, each summer for summing the plurality of weighted path signals corresponding to one of the plurality of antennas to produce one of the plurality of conditioned signals.

23. A wireless communication system, operable with a plurality of antennas, each antenna for transmitting one of a plurality of conditioned signals, each of the conditioned signals generated by conditioning an information signal in accordance with one of a plurality of parameter sets, and operable with a received signal, the received signal comprising a plurality of signal paths transmitted from the plurality of antennas, the wireless communication system comprising:

a channel estimate processor for generating a plurality of channel estimates corresponding to the plurality of signal paths and the plurality of antennas;

a noise floor estimator for generating a noise floor estimate; and a pre-correction processor for generating the plurality of parameter sets in response to the plurality of channel estimates and the noise floor estimate, wherein the plurality of parameter sets comprises a plurality of weighting factors, each weighting factor corresponding to one of a plurality of antenna/path pairs, where each antenna/path pair is associated with one of the plurality of antennas and one of a plurality of transmitted paths, wherein the plurality of parameter sets further comprises a plurality of delay values, each delay value associated with one of the plurality of transmitted paths, and wherein the wireless communication system further comprises a plurality of delay elements, each delay element for delaying the information signal in response to one of the plurality of delay values to produce a plurality of path signals;

a plurality of multipliers, each multiplier for weighting one of the plurality of path signals in response to one of the plurality of weighting factors, to produce a plurality of weighted path signals for each of the plurality of antennas; and a plurality of summers, each summer for summing the plurality of weighted path signals corresponding to one of the plurality of antennas to produce one of the plurality of conditioned signals.

24. A method of transmitting pre-correction of transmit signals in a communication system, comprising:

receiving a noise floor and channel estimates from a mobile station;

computing beam forming parameters in response to the noise floor and channel estimates;

conditioning data in response to the beam forming parameters; and transmitting the conditioned data using a plurality of antennas, wherein the beam forming parameters comprise a plurality of per-path delays and per-antenna/per-path weighting factors and the conditioning comprises:

covering a pilot signal with a plurality of per-antenna/per-path codes;

covering a data signal with a data code;

combining each of the plurality of covered pilot signals with the covered data signal to produce a plurality of per-antenna/per-path signals;

delaying each per-antenna/per-path signal according to the respective per-path delay; and weighting the plurality of delayed per-antenna/per-path signals in response to the per-antenna/per-path weighting factors to produce the conditioned signals.

25. The method of claim 24, further comprising transmitting a plurality of pilot signals using the plurality of antennas.

26. The method of claim 25, further comprising conditioning the plurality of pilot signals in response to the beam forming parameters prior to transmitting the plurality of pilot signals using the plurality of antennas.

27. The method of claim 24, wherein the beam forming parameters comprise Weiner weights computed in response to the channel estimates and the noise floor estimate.

28. The method of claim 24, wherein the beam forming parameters comprise Maximal Ratio Combining weights computed in response to the channel estimates and the noise floor estimate.

29. The method of claim 24, wherein the beam forming parameters comprise FIR tap values computed in response to the channel estimates and the noise floor estimate.

30. The method of claim 24 wherein the beam forming parameters comprise a plurality of per-path delays and per-antenna/per-path weighting factors and the conditioning comprises:

delaying the data according to the plurality of per-path delays to produce a plurality of delayed data signals; and weighting the plurality of delayed data signals in response to the per-antenna/per-path weighting factors to produce the conditioned signals.

31. The method of claim 30 further comprising:

covering a pilot signal with a plurality of per-antenna codes to produce per-antenna pilots;

multiplexing the respective conditioned signals with the per-antenna codes prior to transmission on the plurality of antennas.

32. A method of transmitting pre-correction of transmit signals in a communication system, comprising:

receiving a noise floor and channel estimates from a mobile station;

computing beam forming parameters in response to the noise floor and channel estimates;

selecting a set of best beam parameters from the beam forming parameters;

conditioning data in response to the best beam forming parameters; and transmitting the conditioned data using a plurality of antennas, wherein the beam forming parameters comprise a plurality of per-path delays and per-antenna/per-path weighting factors and the conditioning comprises:

covering a pilot signal with a plurality of per-antenna/per-path codes;

covering a data signal with a data code;

combining each of the plurality of covered pilot signals with the covered data signal to produce a plurality of per-antenna/per-path signals;

delaying each per-antenna/per-path signal according to the respective per-path delay; and weighting the plurality of delayed per-antenna/per-path signals in response to the per-antenna/per-path weighting factors to produce the conditioned signals.

33. The method of claim 32, further comprising normalizing the best beam parameters according to the available transmit power.

34. The method of claim 32, wherein the beam forming parameters comprise Weiner weights computed in response to the channel estimates and the noise floor estimate.

35. The method of claim 32, wherein the beam forming parameters comprise Maximal Ratio Combining weights computed in response to the channel estimates and the noise floor estimate.

36. The method of claim 32, wherein the beam forming parameters comprise FIR tap values computed in response to the channel estimates and the noise floor estimate.

37. An apparatus of transmitting pre-correction of transmit signals in a communication system, comprising:

means for receiving a noise floor and channel estimates from a mobile station;

means for computing beam forming parameters in response to the noise floor and channel estimates;

means for conditioning data in response to the beam forming parameters; and means for transmitting the conditioned data using a plurality of antennas, wherein the beam forming parameters comprise a plurality of per-path delays and per-antenna/per-path weighting factors and the data conditioning means comprises:

means for covering a pilot signal with a plurality of per-antenna/per-path codes;

means for covering a data signal with a data code;

means for combining each of the plurality of covered pilot signals with the covered data signal to produce a plurality of per-antenna/per-path signals;

means for delaying each per-antenna/per-path signal according to the respective per-path delay; and means for weighting the plurality of delayed per-antenna/per-path signals in response to the per-antenna/per-path weighting factors to produce the conditioned signals.

38. The apparatus of claim 37, further comprising means for transmitting a plurality of pilot signals using the plurality of antennas.

39. An apparatus of transmitting pre-correction of transmit signals in a communication system, comprising:
means for receiving a noise floor and channel estimates from a mobile station;
means for computing beam forming parameters in response to the noise and channel estimates;
means for selecting a set of best beam parameters from the beam forming parameters;
means for conditioning data in response to the best beam forming parameters; and
means for transmitting the conditioned data using a plurality of antennas,
wherein the beam forming parameters comprise a plurality of per-path delays and per-antenna/per-path weighting factors and the data conditioning means comprises:
means for covering a pilot signal with a plurality of per-antenna/per-path codes;
means for covering a data signal with a data code;
means for combining each of the plurality of covered pilot signals with the covered data signal to produce a plurality of per-antenna/per-path signals;
means for delaying each per-antenna/per-path signal according to the respective per-path delay; and
means for weighting the plurality of delayed per-antenna/per-path signals in response to the per-antenna/per-path weighting factors to produce the conditioned signals.

40. The apparatus of claim 39, further comprising means for normalizing the best beam parameters according to the available transmit power.

41. A wireless communication system providing transmitting pre-correction of transmit signals, comprising:
means for receiving a noise floor and channel estimates from a mobile station;
means for computing beam forming parameters in response to the noise floor and channel estimates;
means for conditioning data in response to the beam forming parameters; and
means for transmitting the conditioned data using a plurality of antennas,
wherein the beam forming parameters comprise a plurality of per-path delays and per-antenna/per-path weighting factors and the data conditioning means comprises:
means for covering a pilot signal with a plurality of per-antenna/per-path codes;
means for covering a data signal with a data code;
means for combining each of the plurality of covered pilot signals with the covered data signal to produce a plurality of per-antenna/per-path signals;
means for delaying each per-antenna/per-path signal according to the respective per-path delay; and
means for weighting the plurality of delayed per-antenna/per-path signals in response to the per-antenna/per-path weighting factors to produce the conditioned signals.

42. A wireless communication system providing transmitting pre-correction of transmit signals, comprising:
means for receiving a noise floor and channel estimates from a mobile station;
means for computing beam forming parameters in response to the noise floor and channel estimates;
means for selecting a set of best beam parameters from the beam forming parameters;
means for conditioning data in response to the best beam forming parameters; and
means for transmitting the conditioned data using a plurality of antennas,
wherein the beam forming parameters comprise a plurality of per-path delays and per-antenna/per-path weighting factors and the data conditioning means comprises:
means for covering a pilot signal with a plurality of per-antenna/per-path codes;
means for covering a data signal with a data code;
means for combining each of the plurality of covered pilot signals with the covered data signal to produce a plurality of per-antenna/per-path signals;
means for delaying each per-antenna/per-path signal according to the respective per-path delay; and
means for weighting the plurality of delayed per-antenna/per-path signals in response to the per-antenna/per-path weighting factors to produce the conditioned signals.

43. Processor readable media operable to perform the following steps:
receiving a noise floor and channel estimates from a mobile station;
computing beam forming parameters in response to the noise floor and channel estimates;
conditioning data in response to the beam forming parameters; and
transmitting the conditioned data using a plurality of antennas,
wherein the beam forming parameters comprise a plurality of per-path delays and per-antenna/per-path weighting factors and the conditioning comprises:
covering a pilot signal with a plurality of per-antenna/per-path codes;
covering a data signal with a data code;
combining each of the plurality of covered pilot signals with the covered data signal to produce a plurality of per-antenna/per-path signals;
delaying each per-antenna/per-path signal according to the respective per-path delay; and
weighting the plurality of delayed per-antenna/per-path signals in response to the per-antenna/per-path weighting factors to produce the conditioned signals.

44. Processor readable media operable to perform the following steps:
receiving a noise floor and channel estimates from a mobile station;
computing beam forming parameters in response to the noise floor and channel estimates;
selecting a set of best beam parameters from the beam forming parameters;
conditioning data in response to the best beam forming parameters; and
transmitting the conditioned data using a plurality of antennas,
wherein the beam forming parameters comprise a plurality of per-path delays and per-antenna/per-path weighting factors and the conditioning comprises:
covering a pilot signal with a plurality of per-antenna/per-path codes;
covering a data signal with a data code;
combining each of the plurality of covered pilot signals with the covered data signal to produce a plurality of per-antenna/per-path signals;
delaying each per-antenna/per-path signal according to the respective per-path delay; and
weighting the plurality of delayed per-antenna/per-path signals in response to the per-antenna/per-path weighting factors to produce the conditioned signals.

* * * * *